(12) United States Patent
Hosoe et al.

(10) Patent No.: US 8,541,134 B2
(45) Date of Patent: Sep. 24, 2013

(54) ELECTRODE USING THREE-DIMENSIONAL NETWORK ALUMINUM POROUS BODY, AND NONAQUEOUS ELECTROLYTE BATTERY, CAPACITOR AND LITHIUM-ION CAPACITOR WITH NONAQUEOUS ELECTROLYTIC SOLUTION, EACH USING THE ELECTRODE

(75) Inventors: Akihisa Hosoe, Osaka (JP); Kazuki Okuno, Osaka (JP); Hajime Ota, Osaka (JP); Koutarou Kimura, Osaka (JP); Kengo Goto, Osaka (JP); Hideaki Sakaida, Osaka (JP); Junichi Nishimura, Imizu (JP)

(73) Assignees: Sumitomo Electric Industries, Ltd., Osaka-shi, Osaka (JP); Sumitomo Electric Toyama Co., Ltd., Imizu-shi, Toyama (JP)

( * ) Notice: Subject to any disclaimer, the term of this patent is extended or adjusted under 35 U.S.C. 154(b) by 0 days.

(21) Appl. No.: 13/569,300

(22) Filed: Aug. 8, 2012

(65) Prior Publication Data

US 2013/0040195 A1 Feb. 14, 2013

Related U.S. Application Data

(63) Continuation of application No. PCT/JP2012/053514, filed on Feb. 15, 2012.

(30) Foreign Application Priority Data

Feb. 18, 2011 (JP) ................................. 2011-032999
Dec. 21, 2011 (JP) ................................. 2011-279393

(51) Int. Cl.
*H01M 4/66* (2006.01)
(52) U.S. Cl.
USPC ......................................... 429/211; 429/245

(58) Field of Classification Search
USPC .................... 429/231.95, 212, 207, 211, 245; 174/126.1; 361/502, 523
See application file for complete search history.

(56) References Cited

U.S. PATENT DOCUMENTS

2009/0053607 A1* 2/2009 Jeong et al. ............. 429/231.95
2010/0320080 A1* 12/2010 Takezawa et al. ............ 204/242

(Continued)

FOREIGN PATENT DOCUMENTS

| JP | 56-086459 A | 7/1981 |
| JP | 3-130395 A | 6/1991 |

(Continued)

OTHER PUBLICATIONS

U.S. Appl. No. 13/539,583, Hosoe et al.
U.S. Appl. No. 13/557,430, Hosoe et al.
U.S. Appl. No. 13/539,557, Hosoe et al.

(Continued)

*Primary Examiner* — Mark F Huff
*Assistant Examiner* — Monique Wills
(74) *Attorney, Agent, or Firm* — Drinker Biddle & Reath LLP

(57) ABSTRACT

In an electrode according to the present invention including a three-dimensional network aluminum porous body as a base material, the electrode is a sheet-shaped electrode, and a cell of the three-dimensional network aluminum porous body has an elliptic shape having a minor axis in the thickness direction of the electrode in a cross section parallel to the longitudinal direction and thickness direction of the electrode, and a cell of the three-dimensional network aluminum porous body has an elliptic shape having a minor axis in the thickness direction of the electrode in a cross section parallel to the width direction and thickness direction of the electrode. The electrode is preferably obtained by subjecting the three-dimensional network aluminum porous body to at least a current collecting lead welding step, an active material filling step and a compressing step.

9 Claims, 17 Drawing Sheets

(56) References Cited

U.S. PATENT DOCUMENTS

| | | | |
|---|---|---|---|
| 2011/0189541 A1* | 8/2011 | Kitagawa et al. | 429/217 |
| 2012/0077084 A1* | 3/2012 | Christensen et al. | 429/212 |
| 2012/0135142 A1* | 5/2012 | Yang et al. | 427/247 |

FOREIGN PATENT DOCUMENTS

| | | |
|---|---|---|
| JP | 08-170126 A | 7/1996 |
| JP | 3202072 B2 | 8/2001 |
| JP | 2003-109600 A | 4/2003 |
| JP | 3413662 B2 | 6/2003 |
| JP | 2010-009905 A | 1/2010 |
| JP | 2010-037569 A | 2/2010 |
| JP | 2010-232171 A | 10/2010 |

OTHER PUBLICATIONS

U.S. Appl. No. 13/539,573, Hosoe et al.
U.S. Appl. No. 13/483,505, Hosoe et al.
U.S. Appl. No. 13/483,609, Hosoe et al.
U.S. Appl. No. 13/483,626, Hosoe et al.
U.S. Appl. No. 13/494,353, Hosoe et al.
U.S. Appl. No. 13/569,319, Hosoe et al.
U.S. Appl. No. 13/569,322, Hosoe et al.
U.S. Appl. No. 13/569,325, Hosoe et al.
U.S. Appl. No. 13/539,587, Hosoe et al.
U.S. Appl. No. 13/557,442, Hosoe et al.
U.S. Appl. No. 13/470,817, Hosoe et al.
U.S. Appl. No. 13/569,288, Hosoe et al.

* cited by examiner

ELECTRODE USING THREE-DIMENSIONAL NETWORK ALUMINUM POROUS BODY, AND NONAQUEOUS ELECTROLYTE BATTERY, CAPACITOR AND LITHIUM-ION CAPACITOR WITH NONAQUEOUS ELECTROLYTIC SOLUTION, EACH USING THE ELECTRODE

TECHNICAL FIELD

The present invention relates to a three-dimensional network aluminum porous body which is used as an electrode for a nonaqueous electrolyte battery (lithium battery, etc.), a capacitor with a nonaqueous electrolytic solution (hereinafter, also referred to as a "capacitor"), a lithium-ion capacitor with a nonaqueous electrolytic solution and the like.

BACKGROUND ART

Metal porous bodies having a three-dimensional network structure have been used in a wide range of applications, such as various filters, catalyst supports and battery electrodes. For example, Celmet (manufactured by Sumitomo Electric Industries, Ltd., registered trademark) composed of three-dimensional network nickel porous body (hereinafter, referred to as a "nickel porous body") has been used as an electrode material for batteries, such as nickel-metal hydride batteries and nickel-cadmium batteries. Celmet is a metal porous body having continuous pores and characteristically has a higher porosity (90% or more) than other porous bodies such as metallic nonwoven fabrics. Celmet can be obtained by forming a nickel layer on the surface of the skeleton of a porous resin molded body having continuous pores such as urethane foam, then decomposing the resin molded body by heat treatment, and reducing the nickel. The nickel layer is formed by performing a conductive treatment of applying a carbon powder or the like to the surface of the skeleton of the resin molded body and then depositing nickel by electroplating.

On the other hand, as with nickel, aluminum has excellent characteristics such as a conductive property, corrosion resistance and lightweight, and for applications in batteries, for example, an aluminum foil in which an active material, such as lithium cobalt oxide, is applied onto the surface thereof has been used as a positive electrode of a lithium battery. In order to increase the capacity of a positive electrode, it is considered that a three-dimensional network aluminum porous body (hereinafter, referred to as an "aluminum porous body") in which the surface area of aluminum is increased is used and the inside of the aluminum is filled with an active material. The reason for this is that this allows the active material to be utilized even in an electrode having a large thickness and improves the active material availability ratio per unit area.

As a method for producing an aluminum porous body, Patent Literature 1 describes a method of subjecting a three-dimensional network plastic substrate having an inner continuous space to an aluminum vapor deposition process by an arc ion plating method to form a metallic aluminum layer having a thickness of 2 to 20 μm.

It is said that in accordance with this method, an aluminum porous body having a thickness of 2 to 20 μm is obtained, but since this method is based on a vapor-phase process, it is difficult to produce a large-area porous body, and it is difficult to form a layer which is internally uniform depend on the thickness or porosity of the substrate. Further, this method has problems that a formation rate of the aluminum layer is low and production cost is high since equipment for production is expensive. Moreover, when a thick film is formed, there is a possibility that cracks may be produced in the film or aluminum may exfoliate.

Patent Literature 2 describes a method of obtaining an aluminum porous body, including forming a film made of a metal (such as copper) on the skeleton of a resin foam molded body having a three-dimensional network structure, the metal having an ability to form a eutectic alloy at a temperature equal to or below the melting point of aluminum, then applying an aluminum paste to the film, and performing a heat treatment in a non-oxidizing atmosphere at a temperature of 550° C. or higher and 750° C. or lower to remove an organic constituent (resin foam) and sinter an aluminum powder.

However, in accordance with this method, a layer which forms a eutectic alloy of the above-mentioned metal and aluminum is produced and an aluminum layer of high purity cannot be formed.

As other methods, it is considered that a resin molded body having a three-dimensional network structure is subjected to aluminum plating. An electroplating process of aluminum itself is known, but since aluminum has high chemical affinity to oxygen and a lower electric potential than hydrogen, the electroplating in a plating bath containing an aqueous solution system is difficult. Thus, conventionally, aluminum electroplating has been studied in a plating bath containing a nonaqueous solution system. For example, as a technique for plating a metal surface with aluminum for the purpose of antioxidation of the metal surface, Patent Literature 3 discloses an aluminum electroplating method wherein a low melting composition, which is a blend melt of an onium halide and an aluminum halide, is used as a plating bath, and aluminum is deposited on a cathode while the water content of the plating bath is maintained at 2 mass % or less.

However, in the aluminum electroplating, plating of only a metal surface is possible, and there is no known method of electroplating on the surface of a resin molded body, in particular electroplating on the surface of a resin molded body having a three-dimensional network structure.

The present inventors have made earnest investigations concerning a method of electroplating the surface of a resin molded body made of polyurethane having a three-dimensional network structure with aluminum, and have found that it is possible to electroplate the surface of a resin molded body made of polyurethane by plating the resin molded body made of polyurethane, in which at least the surface is made electrically conductive, with aluminum in a molten salt bath. These findings have led to completion of a method for producing an aluminum porous body. In accordance with this production method, an aluminum structure having a resin molded body made of polyurethane as the core of its skeleton can be obtained. For some applications such as various filters and catalyst supports, the aluminum structure may be used as a resin-metal composite as it is, but when the aluminum structure is used as a metal structure without resin because of constraints resulting from the usage environment, an aluminum porous body needs to be formed by removing the resin.

Removal of the resin can be performed by any method, including decomposition (dissolution) with an organic solvent, a molten salt or supercritical water, decomposition by heating or the like.

Here, a method of decomposition by heating at high temperature or the like is convenient, but it involves oxidation of aluminum. Since aluminum is difficult to reduce after being oxidized once as distinct from nickel, if being used in, for example, an electrode material of a battery or the like, the electrode loses a conductive property due to oxidation, and therefore aluminum cannot be used as the electrode material.

Thus, the present inventors have completed a method for producing an aluminum porous body, in which an aluminum structure obtained by forming an aluminum layer on the surface of a resin molded body is heated to a temperature equal to or below the melting point of aluminum in a state of being dipped in a molten salt while applying a negative potential to the aluminum layer to remove the resin molded body through thermal decomposition to obtain an aluminum porous body, as a method of removing a resin without causing the oxidation of aluminum.

Incidentally, in order to use the aluminum porous body thus obtained as an electrode, it is necessary to attach a lead wire to the aluminum porous body to form a current collector, fill the aluminum porous body serving as the current collector with an active material, and subject the resulting aluminum porous body to treatments such as compressing and cutting by a process shown in FIG. 1, but a technology for practical use for industrially producing electrodes for nonaqueous electrolyte batteries, and capacitors and lithium-ion capacitors each using a nonaqueous electrolytic solution, and the like from an aluminum porous body has not yet been known.

CITATION LIST

Patent Literatures

Patent Literature 1: Japanese Patent No. 3413662
Patent Literature 2: Japanese Unexamined Patent Publication No. 8-170126
Patent Literature 3: Japanese Patent No. 3202072
Patent Literature 4: Japanese Unexamined Patent Publication No. 56-86459

SUMMARY OF INVENTION

Technical Problem

It is an object of the present invention to provide a technology for practical use for industrially producing an electrode from an aluminum porous body, and to provide an electrode using a three-dimensional network aluminum porous body, and a nonaqueous electrolyte battery, a capacitor and a lithium-ion capacitor, each using the electrode.

Solution to Problem

The constitution of the present invention is as follows.

(1) An electrode comprising a three-dimensional network aluminum porous body as a base material, wherein the electrode is a sheet-shaped electrode; and the three-dimensional network aluminum porous body has an elliptic shaped cell having a minor axis in a thickness direction of the electrode in a cross section parallel to a longitudinal direction and the thickness direction of the electrode; and the three-dimensional network aluminum porous body has an elliptic shaped cell having a minor axis in the thickness direction of the electrode in a cross section parallel to a width direction and the thickness direction of the electrode.

(2) The electrode according to (1), which is obtained by subjecting the three-dimensional network aluminum porous body to at least a current collecting lead welding step, an active material filling step and a compressing step.

(3) An electrode comprising a three-dimensional network aluminum porous body as a base material, wherein the electrode is a sheet-shaped electrode; and the three-dimensional network aluminum porous body has an elliptic shaped cell having a minor axis in a width direction of the electrode in a cross section parallel to a thickness direction of the electrode.

(4) An electrode comprising a three-dimensional network aluminum porous body as a base material, wherein the electrode is a sheet-shaped electrode; and the three-dimensional network aluminum porous body has a circular shaped cell in a cross section parallel to a thickness direction of the electrode.

(5) The electrode according to any one of (1) to (4), wherein when a cross section in the thickness direction of the electrode is divided into three regions of a region 1, a region 2 and a region 3 in this order,
a ratio of the number of cross sections of an aluminum skeleton in the region 1 to the number of cross sections of an aluminum skeleton in the region 2 is 0.8 or more and 1.2 or less, and
a ratio of the number of cross sections of an aluminum skeleton in the region 3 to the number of cross sections of an aluminum skeleton in the region 2 is 0.8 or more and 1.2 or less.

(6) The electrode according to any one of (1) to (4), wherein when a cross section in the thickness direction of the electrode is divided into three regions of a region 1, a region 2 and a region 3 in this order,
a ratio of the average of the number of cross sections of an aluminum skeleton in the region 1 and the region 3 to the number of cross sections of an aluminum skeleton in the region 2 is larger than 1.2.

(7) The electrode according to any one of (1) to (4), wherein when a cross section in the thickness direction of the electrode is divided into three regions of a region 1, a region 2 and a region 3 in this order,
a ratio of the average of the number of cross sections of an aluminum skeleton in the region 1 and the region 3 to the number of cross sections of an aluminum skeleton in the region 2 is smaller than 0.8.

(8) The electrode according to any one of (1) to (7), wherein the outermost surface of the three-dimensional network aluminum porous body is covered with an active material, and the three-dimensional network aluminum porous body is not exposed from the active material.

(9) The electrode according to any one of (1) to (7), wherein the active material is not present in a portion from the outermost surface to a depth of 0.02 mm of the three-dimensional network aluminum porous body.

(10) A nonaqueous electrolyte battery, comprising using the electrode according to any one of (1) to (9).

(11) A capacitor with a nonaqueous electrolytic solution, comprising using the electrode according to any one of (1) to (9).

(12) A lithium-ion capacitor with a nonaqueous electrolytic solution, comprising using the electrode according to any one of (1) to (9).

Advantageous Effects of Invention

The electrode of the present invention can be produced by a process of continuous production and can reduce industrial production cost.

Further, the electrode of the present invention can be used for a nonaqueous electrolyte battery, and a capacitor and a lithium-ion capacitor each using a nonaqueous electrolytic solution and the like, and can improve the output characteristics of such a battery, a capacitor and a lithium-ion capacitor or can lengthen its life.

DESCRIPTION OF EMBODIMENTS

An electrode according to the present invention can achieve various effects by using a sheet-shaped three-dimensional network aluminum porous body as a base material of the electrode.

The electrode of the present invention preferably has the following configurations.

[1] In a cross section in the thickness direction of the electrode, the shape of a cell is brought into a specific state.

[2] In the thickness direction of the electrode, the distribution of the amount of aluminum forming a skeleton is brought into a specific state.

[3] The state of filling an active material into an aluminum porous body is brought into a specific state.

Hereinafter, each configuration will be described.

—Constitution of [1]—

When adding the constitution of [1] to the electrode of the present invention, the following aspects <1-1> to <1-3> are conceivable.

<1-1> An aspect in which in a cross section in the thickness direction of the electrode, the shape of the cell is brought into an elliptic shape having a minor axis in the thickness direction.

<1-2> An aspect in which in a cross section in the thickness direction of the electrode, the shape of the cell is brought into an elliptic shape having a minor axis in the width direction.

<1-3> An aspect in which in a cross section in the thickness direction of the electrode, the shape of the cell is brought into a circular shape.

Hereinafter, each aspect will be described.

——Aspect of <1-1>——

In order to increase the output characteristics of the electrode, it is effective to enhance the availability ratio of an active material. Examples of a method of enhancing the availability ratio of the active material include methods of shortening the distance between the skeleton of the electrode and the active material.

From this viewpoint, in the electrode of the present invention, it is preferred that a cell of the three-dimensional network aluminum porous body has an elliptic shape having a minor axis in the thickness direction of the electrode in a cross section parallel to the longitudinal direction and thickness direction of the sheet-shaped electrode, and a cell of the three-dimensional network aluminum porous body has an elliptic shape having a minor axis in the thickness direction of the electrode in a cross section parallel to the width direction and thickness direction of the electrode. Thereby, since the distance between the active material and the skeleton of the base material is shortened, the electrode of the present invention becomes an electrode capable of providing a battery, a capacitor and a lithium-ion capacitor, each having a small current collecting distance and a high output.

Figure 1:
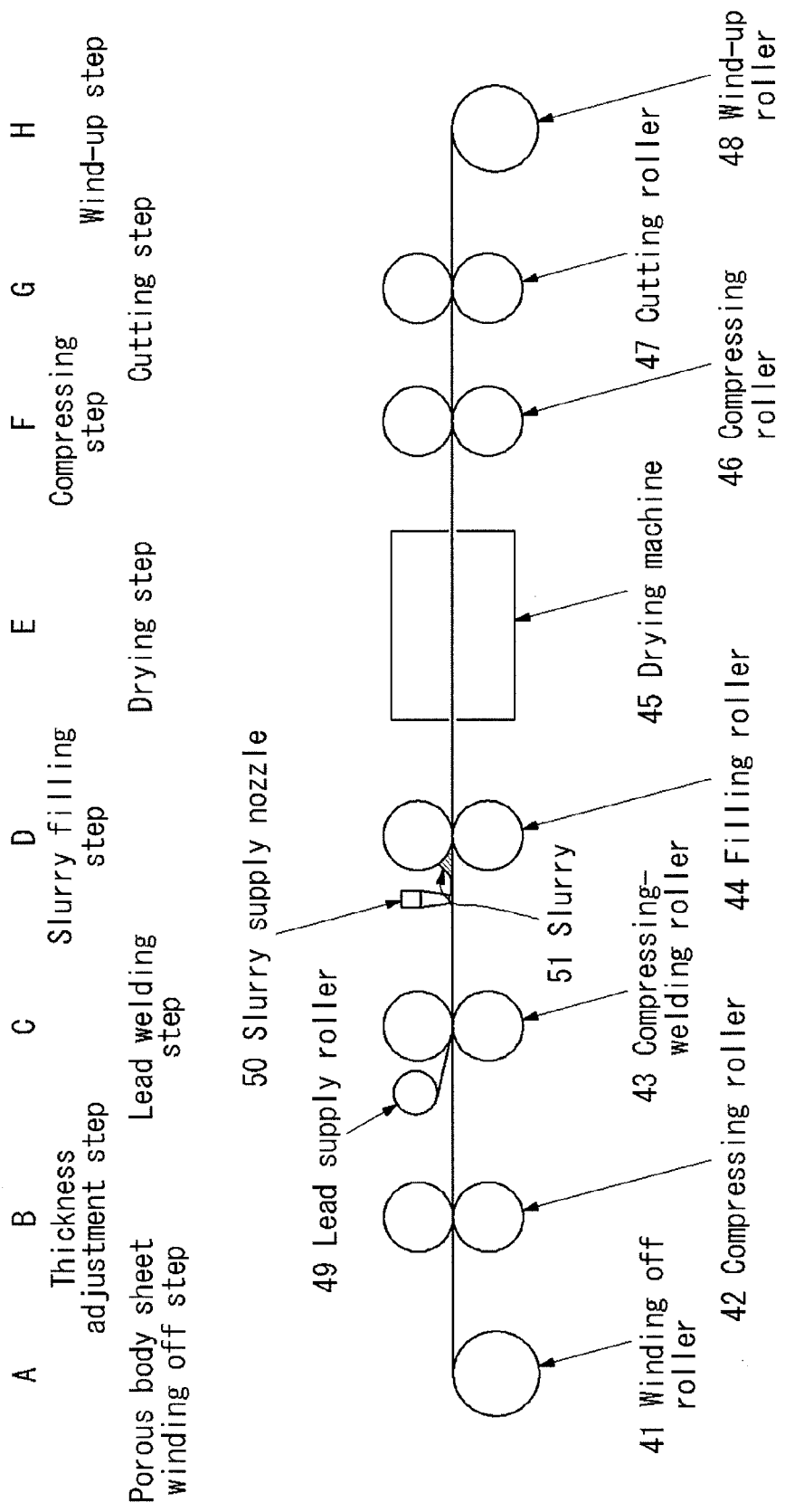
FIG. 1 is a view showing a process for producing an electrode material from an aluminum porous body.

In order to prepare such an electrode, it is effective to press an electrode by applying sufficient pressure in the compressing step of the electrode shown, for example, in F of FIG. 1. Further, for example, it is also effective to be subjected to compression prior to the preparation of the electrode.

Therefore, the electrode of the present invention is preferably obtained by subjecting the three-dimensional network aluminum porous body to at least a current collecting lead welding step, an active material filling step and a compressing step.

——Aspect of <1-2>——

From the same viewpoint as in the aspect of <1-1>, in the electrode of the present invention, it is also preferred that a cell of the three-dimensional network aluminum porous body, a base material, has an elliptic shape having a minor axis in the width direction of the electrode in a cross section parallel to the thickness direction of the sheet-shaped electrode. Thereby, since the distance between the active material and the skeleton of the base material is shortened, the electrode of the present invention becomes an electrode capable of providing a battery, a capacitor and a lithium-ion capacitor, each having a small current collecting distance and a high output.

In order to prepare such an electrode, it is effective to prepare an electrode while applying a tensile force of, for example, 0.5 MPa or more and 2 MPa or less in the production step of the electrode.

——Aspect of <1-3>——

When there are variations of the distance between the active material and the skeleton of the base material within the electrode, since there are variations of a current collecting distance of the active material, a current distribution is large and a life is shortened.

From this viewpoint, in the electrode of the present invention, it is preferred that a cell of the three-dimensional network aluminum porous body, a base material, has a circular shape in a cross section parallel to the thickness direction of the sheet-shaped electrode. Thereby, since there is no variation of the distance between the active material and the skeleton of the base material, a current collecting distance becomes uniform, and therefore the electrode of the present invention becomes an electrode capable of providing a battery, a capacitor and a lithium-ion capacitor, each having a small current distribution and a long life.

Examples of a method of preparing such an electrode include methods for producing an electrode without compressing in the production step of the electrode.

—Constitution of [2]—

When adding the constitution of [2] to the electrode of the present invention, the following aspects <2-1> to <2-3> are conceivable.

<2-1> An aspect in which in a cross section in the thickness direction of the electrode, the number of cross sections of an aluminum skeleton is maintained uniformly in the aluminum direction and does not have a distribution.

Figure 2:
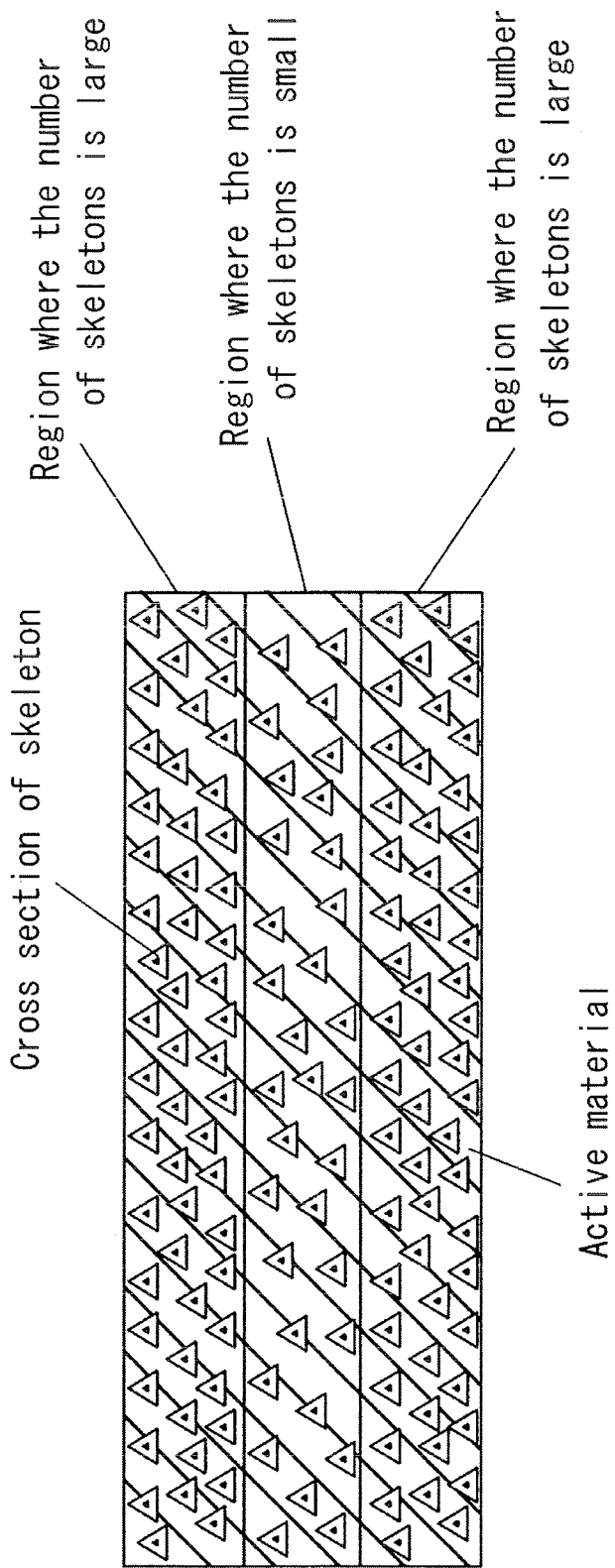
FIG. 2 is a schematic sectional view showing an aluminum porous body in which in a cross section in the thickness direction of an electrode, the number of cross sections of an aluminum skeleton in outer surface portions (surface and rear surface) is larger than the number of cross sections of an aluminum skeleton in an inner portion (central portion).

<2-2> As shown in FIG. 2, an aspect in which in a cross section in the thickness direction of the electrode, the number of cross sections of an aluminum skeleton in outer surface portions (surface and rear surface) is increased and the number of cross sections of an aluminum skeleton in an inner portion (central portion) is decreased.

Figure 3:
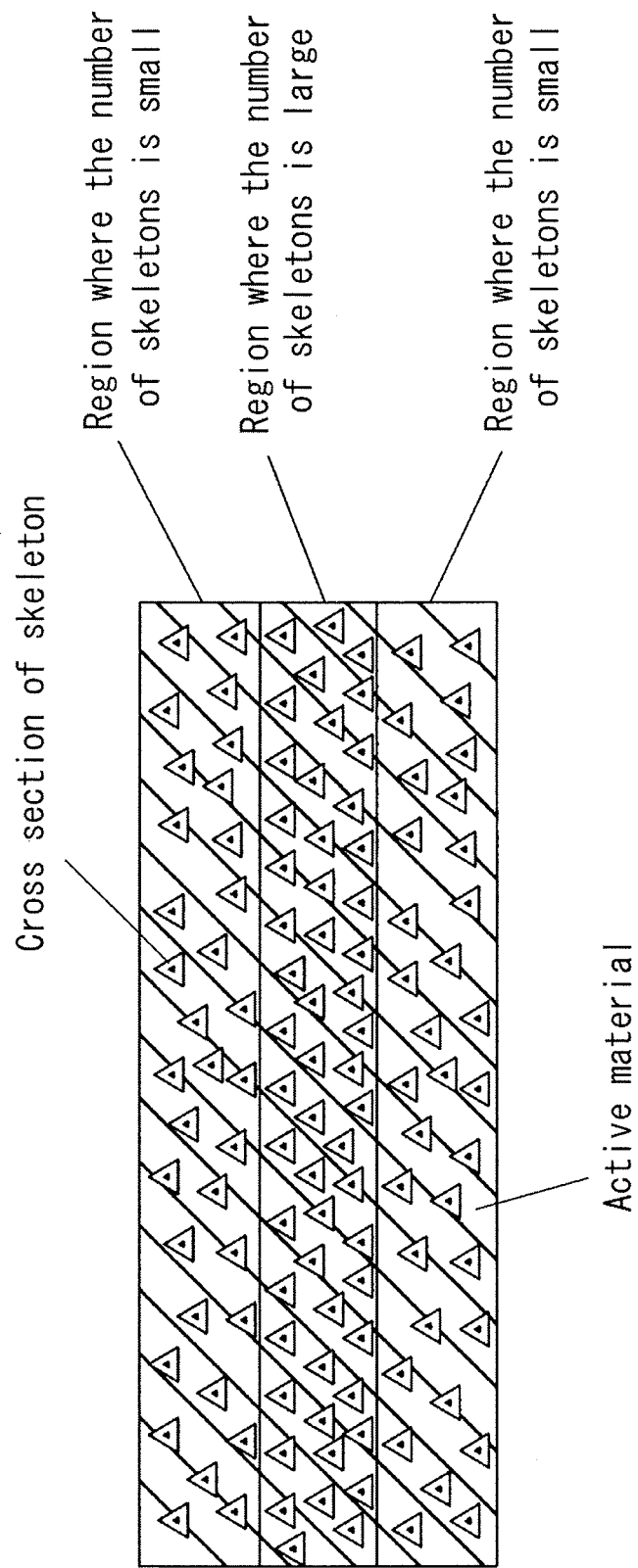
FIG. 3 is a schematic sectional view showing an aluminum porous body in which in a cross section in the thickness direction of an electrode, the number of cross sections of an aluminum skeleton in an inner portion (central portion) is larger than the number of cross sections of an aluminum skeleton in outer surface portions (surface and rear surface).

<2-3> As shown in FIG. 3, an aspect in which in a cross section in the thickness direction of the electrode, the number of cross sections of an aluminum skeleton in an inner portion (central portion) is increased and the number of cross sections of an aluminum skeleton in outer surface portions (surface and rear surface) is decreased.

Hereinafter, each aspect will be described.

——Aspect of <2-1>——

In the aluminum porous body, when the number of cross sections of the aluminum skeleton in the cross section in the thickness direction is uniform in the thickness direction, a current is flown uniformly in the porous body in applying a voltage to the aluminum porous body. Thus, when such an aluminum porous body is used as a base material of the electrode, current collecting is uniformly performed and a long life of the electrode can be realized.

Therefore, in the electrode of the present invention, when a cross section in the thickness direction of the electrode is divided into three regions of a region 1, a region 2 and a region 3 in this order, a ratio of the number of cross sections of an aluminum skeleton in the region 1 to the number of cross sections of an aluminum skeleton in the region 2 is preferably 0.8 or more and 1.2 or less, and a ratio of the number of cross sections of an aluminum skeleton in the region 3 to the number of cross sections of an aluminum skeleton in the region 2 is preferably 0.8 or more and 1.2 or less. Moreover, the ratio of the number of cross sections of the aluminum skeleton in the region 1 to the number of cross sections of the aluminum skeleton in the region 2 is more preferably 0.9 or more and 1.1 or less, and the ratio of the number of cross sections of the aluminum skeleton in the region 3 to the number of cross sections of the aluminum skeleton in the region 2 is preferably 0.9 or more and 1.1 or less.

In the present invention, the number of cross sections of the aluminum skeleton in each region in a cross section in the thickness direction of the electrode can be measured by the following manner.

First, a cross section of the electrode is exposed by polishing, and the cross section is observed with a microscope and a photograph of the cross section is taken. Subsequently, the photograph is divided into three regions in the thickness direction of the electrode, and these regions are defined as a region 1, a region 2 and a region 3. Then, a sum of the number of cross sections of the aluminum skeleton (i.e., the number of metal portions of the porous body skeleton) contained in the respective region in the photograph is calculated. This measurement is performed five times at different cross sections and an average value thereof is calculated.

In addition, this measurement method can be similarly applied to the aluminum porous body, and in this case, a resin is filled into an opening portion of the aluminum porous body, and after the resin is cured, a cross section of the resin may be exposed by polishing. Examples of the resin to be filled include an epoxy resin, an acrylic resin, and a polyester resin.

In order to prepare the above-mentioned electrode of the present invention, an aluminum porous body may be used, as a base material, in which when a cross section in the thickness direction of the aluminum porous body is divided into three regions of a region 1, a region 2 and a region 3 in this order, a ratio of the number of cross sections of an aluminum skeleton in the region 1 to the number of cross sections of an aluminum skeleton in the region 2 is 0.8 or more and 1.2 or less, and a ratio of the number of cross sections of an aluminum skeleton in the region 3 to the number of cross sections of an aluminum skeleton in the region 2 is 0.8 or more and 1.2 or less.

In order to prepare such an aluminum porous body, a common resin molded body made of polyurethane, which is used as a starting material of a metal porous body for an electrode in the production step of an aluminum porous body described later, may be used.

——Aspect of <2-2>——

When an active material is filled into an opening part of the aluminum porous body, in a portion where the number of the skeleton is large, a region where the active material is in contact with the skeleton is increased. That is, in a portion where the number of the skeleton is large, the active material is hardly exfoliated and the holding performance of the active material is increased. Accordingly, it is possible to prevent the exfoliation of the active material and to enhance the holding performance of the active material by using, as a base material of the electrode of the present invention, an aluminum porous body in which in a cross section in the thickness direction of the electrode, the number of cross sections of the aluminum skeleton in outer surface portions (surface and rear surface) is large and the number of cross sections of the aluminum skeleton in an inner portion (central portion) is small.

Therefore, in the electrode of the present invention, when a cross section in the thickness direction of the electrode is divided into three regions of a region 1, a region 2 and a region 3 in this order, a ratio of the average of the number of cross sections of an aluminum skeleton in the region 1 and the region 3 to the number of cross sections of an aluminum skeleton in the region 2 is preferably larger than 1.2, and more preferably larger than 1.5. When the ratio of the average of the number of cross sections of the aluminum skeletons in the region 1 and the region 3 to the number of cross sections of the aluminum skeleton in the region 2 is 1.2 or less, the holding performance of the active material described above is hardly exerted.

The ratio of the number of cross sections of the aluminum skeleton can be determined by measuring the number of cross sections of the aluminum skeleton in each region in the same manner as in the number of cross sections of the aluminum skeleton in each region described above, and calculating a ratio of the number of cross sections. That is, the average of the number of cross sections of the aluminum skeleton in the region 1 and the number of cross sections of the aluminum skeleton in the region 3 may be calculated, and the average may be divided by the number of cross sections of the aluminum skeleton in the region 2.

In order to prepare the above-mentioned electrode of the present invention, an aluminum porous body may be used, as a base material, in which when a cross section in the thickness direction of the aluminum porous body is divided into three regions of a region 1, a region 2 and a region 3 in this order, a ratio of the average of the number of cross sections of an aluminum skeleton in the region 1 and the region 3 to the number of cross sections of an aluminum skeleton in the region 2 is larger than 1.2.

Such an aluminum porous body can be obtained, for example, by laminating aluminum porous bodies each having the different number of cross sections of an aluminum skeleton in a cross section in the thickness direction and then unifying these aluminum porous bodies.

That is, in the electrode of the present invention, it is also effective to use a three-dimensional network aluminum porous body formed by laminating three sheets of aluminum porous bodies A, B and C in this order in the thickness direction to be unified, wherein a ratio of the average of the number of cross sections of aluminum skeletons in the cross sections in the thickness direction of the aluminum porous bodies A and C to the number of cross sections of an aluminum skeleton in the cross section in the thickness direction of the aluminum porous body B is larger than 1.2.

Figure 4:
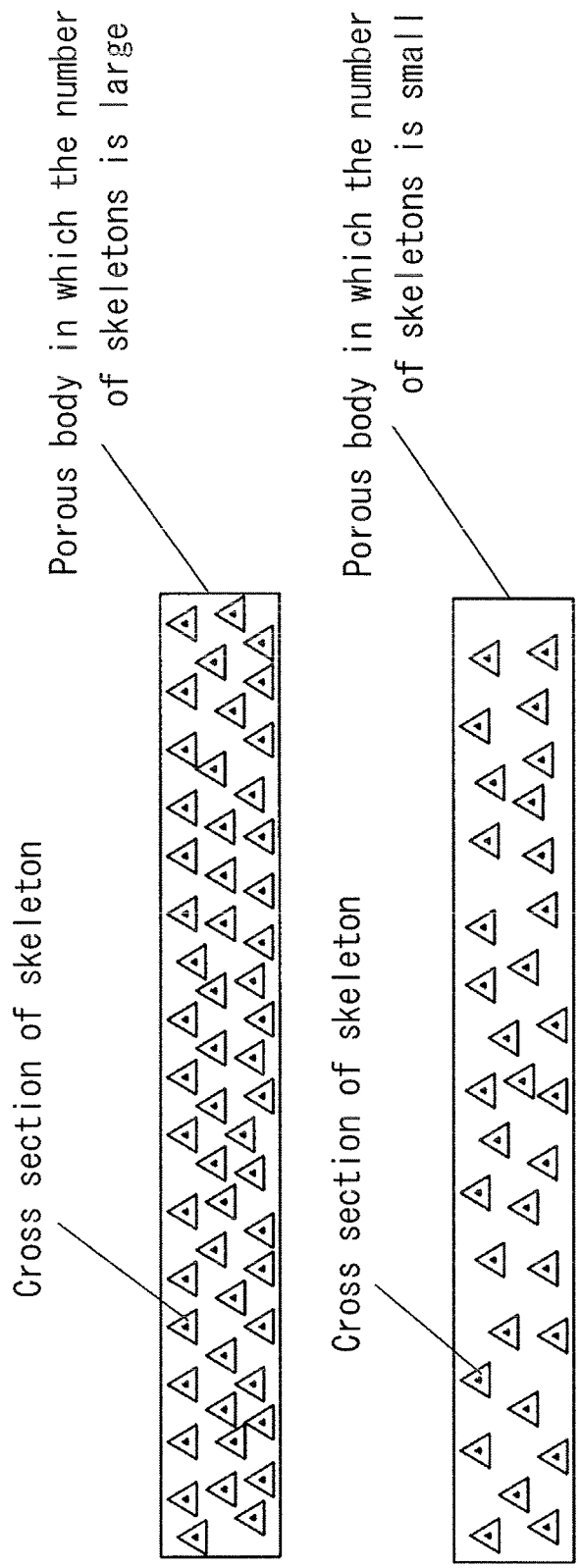
FIG. 4 is a schematic sectional view showing two types of aluminum porous bodies each having the different number of cross sections of an aluminum skeleton in a cross section in the thickness direction of an electrode.

Specifically, as shown in FIG. 4, two kinds of aluminum porous bodies, an aluminum porous body in which the number of cross sections of the aluminum skeleton in a cross section in the thickness direction is large and an aluminum porous body in which the number of cross sections of the aluminum skeleton in a cross section in the thickness direction is small, are prepared. Then, two sheets of the aluminum porous bodies A and C in which the number of cross sections of the aluminum skeleton in a cross section in the thickness direction is large, and the aluminum porous body B in which the number of cross sections of the skeleton is small are laminated with the aluminum porous body B sandwiched between the aluminum porous bodies A and C to be unified.

Thereby, a three-dimensional network aluminum porous body, in which the number of cross sections of the aluminum skeleton in outer surface layer portions (surface and rear surface) in the thickness direction is large, and conversely the number of cross sections of the aluminum skeleton in an inner portion (central portion) in the thickness direction is small, can be prepared. Further, the thickness of the three-dimensional network aluminum porous body can be larger than those of conventional three-dimensional network aluminum porous bodies by laminating a plurality of aluminum porous bodies to unify them.

Further, when the aluminum porous bodies A, B and C are selected so that the ratio of the average of the number of cross sections of the aluminum skeletons in the cross sections in the thickness direction of the aluminum porous bodies A and C to the number of cross sections of the aluminum skeleton in the cross section in the thickness direction of the aluminum porous body B is larger than 1.2, it is possible to improve the holding performance of the active material as described above. Further, the ratio is more preferably larger than 1.5.

Examples of a method of unifying the laminated aluminum porous bodies A to C include methods of overlaying the aluminum porous bodies and compressing them. Among the methods, a method in which the aluminum porous bodies are overlaid and roll-pressed, and then partially welded in order to obtain an electrical contact is preferred. For example, by raising the temperature of the sheet of the laminated aluminum porous bodies up to around the melting point of aluminum in a state of applying pressure to the sheet of the laminated aluminum porous bodies, skeletons in contact with each other can be fused with each other to be unified.

——Aspect of <2-3>——

As described above, when the active material is filled into the opening part of the aluminum porous body, in a portion where the number of the skeletons is large, a region where the active material is in contact with the skeleton is increased, and the distance between the active material and the skeleton is shortened. Therefore, in a portion where the number of the skeletons is large, the holding performance of the active material is increased, and at the same time, the current collecting performance of the active material is increased. Accordingly, it is possible to enhance the current collecting performance within the electrode and utilize the active material within the electrode 100% by using, as a base material of the electrode of the present invention, an aluminum porous body in which in a cross section in the thickness direction of the electrode, the number of cross sections of the aluminum skeleton in outer surface portions (surface and rear surface) is small and the number of cross sections of the aluminum skeleton in an inner portion (central portion) is large.

Therefore, in the electrode of the present invention, when a cross section in the thickness direction of the electrode is divided into three regions of a region 1, a region 2 and a region 3 in this order, a ratio of the average of the number of cross sections of an aluminum skeleton in the region 1 and the region 3 to the number of cross sections of an aluminum skeleton in the region 2 is preferably smaller than 0.8, and more preferably smaller than 0.7. When the ratio of the average of the number of cross sections of the aluminum skeletons in the region 1 and the region 3 to the number of cross sections of the aluminum skeleton in the region 2 is 0.8 or more, the effect of improving current collecting performance within the electrode as described above is hardly exerted.

The ratio of the number of cross sections of the aluminum skeleton can be determined by measuring the number of cross sections of the aluminum skeleton in each region in the same manner as in the number of cross sections of the aluminum skeleton in each region described above, and calculating a ratio of the number of cross sections. That is, the average of the number of cross sections of the aluminum skeleton in the region 1 and the number of cross sections of the aluminum skeleton in the region 3 may be calculated, and the average may be divided by the number of cross sections of the aluminum skeleton in the region 2.

In order to prepare the above-mentioned electrode of the present invention, an aluminum porous body may be used, as a base material, in which when a cross section in the thickness direction of the aluminum porous body is divided into three regions of a region 1, a region 2 and a region 3 in this order, a ratio of the average of the number of cross sections of an aluminum skeleton in the region 1 and the region 3 to the number of cross sections of an aluminum skeleton in the region 2 is smaller than 0.8.

Such an aluminum porous body can be obtained, for example, by laminating aluminum porous bodies each having the different number of cross sections of an aluminum skeleton in a cross section in the thickness direction and then unifying these aluminum porous bodies.

That is, in the electrode of the present invention, it is also effective to use a three-dimensional network aluminum porous body formed by laminating three sheets of aluminum porous bodies D, E and F in this order in the thickness direction to be unified, wherein a ratio of the average of the number of cross sections of aluminum skeletons in the cross sections in the thickness direction of the aluminum porous bodies D and F to the number of cross sections of the aluminum skeleton in the cross section in the thickness direction of the aluminum porous body E is smaller than 0.8.

Specifically, as shown in FIG. 4, two kinds of aluminum porous bodies, an aluminum porous body in which the number of cross sections of the aluminum skeleton in a cross section in the thickness direction is large and an aluminum porous body in which the number of cross sections of the aluminum skeleton in a cross section in the thickness direction is small, are prepared. Then, two sheets of the aluminum porous bodies D and F in which the number of cross sections of the aluminum skeleton in a cross section in the thickness direction is small, and the aluminum porous body E in which the number of cross sections of the skeleton is large are laminated with the aluminum porous body E sandwiched between the aluminum porous bodies D and F to be unified.

Thereby, a three-dimensional network aluminum porous body, in which the number of cross sections of the aluminum skeleton in outer surface layer portions (surface and rear surface) in the thickness direction is small, and conversely the number of cross sections of the aluminum skeleton in an inner portion (central portion) in the thickness direction is large, can be prepared. Further, the thickness of the three-dimensional network aluminum porous body can be larger than those of conventional three-dimensional network aluminum porous bodies by laminating a plurality of aluminum porous bodies to unify them.

Further, when the aluminum porous bodies D, E and F are selected so that the ratio of the average of the number of cross sections of the aluminum skeletons in the cross sections in the thickness direction of the aluminum porous bodies D and F to the number of cross sections of the aluminum skeleton in the cross section in the thickness direction of the aluminum porous body E is smaller than 0.8, it is possible to improve the holding performance of the active material as described above. Further, the ratio is more preferably smaller than 0.7.

Examples of a method of unifying the laminated aluminum porous bodies D to F include methods of overlaying the aluminum porous bodies and compressing them. Among the methods, a method in which the aluminum porous bodies are overlaid and roll-pressed, and then partially welded in order to obtain an electrical contact is preferred. For example, by raising the temperature of the sheet of the laminated aluminum porous bodies up to around the melting point of aluminum in a state of applying pressure to the sheet of the laminated aluminum porous bodies, skeletons in contact with each other can be fused with each other to be unified.

—Constitution of [3]—

When adding the constitution of [3] to the electrode of the present invention, the following aspects <3-1> to <3-2> are conceivable.

<3-1> The outermost surface of an aluminum porous body is fully covered with an active material.

<3-2> The active material is not exposed to the out side of the outermost surface of the aluminum porous body.

Hereinafter, each aspect will be described.

——Aspect of <3-1>——

As shown in FIG. 1, in order to prepare an electrode from the aluminum porous body, filling of the active material (shown as a slurry filling step D in FIG. 1) is performed. Then, the aluminum porous body is formed into an electrode undergoing a drying step and a compressing step, but when the skeleton portion of the aluminum porous body as a current collector is exposed from the surface of the electrode after completion of the electrode, problems that a micro short-circuit and electro-current constriction easily tend to occur, and a life is shortened may arise. Further, a separator needs to be thickened in order to avoid these problems.

Figure 5:
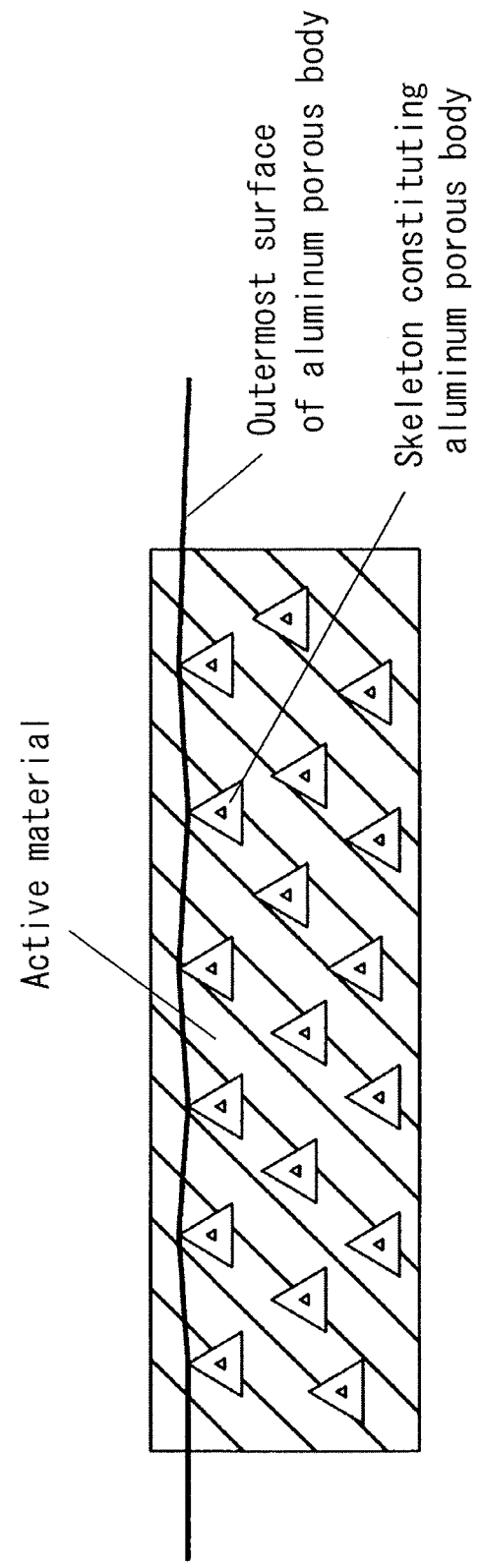
FIG. 5 is a schematic sectional view showing a state in which the surface of an aluminum porous body is covered with an active material.

Therefore, in the electrode of the present invention, as shown in FIG. 5, it is preferred that the outermost surface of a three-dimensional network aluminum porous body as a base material is covered with an active material, and the skeleton of the three-dimensional network aluminum porous body is not exposed from the active material. Thereby, a battery having no micro short-circuit and electro-current constriction, and having a long life can be provided. Further, since the thickness of the separator can be reduced, a battery, a capacitor and a lithium-ion capacitor can be downsized.

In addition, in the present invention, the outermost surface of the aluminum porous body, as shown in FIG. 5, refers to a plane obtained by passing through each apex of the skeleton in the outermost portion of the aluminum porous body. Since FIG. 5 is a conceptional view, the outermost surface of the aluminum porous body is shown in only an upper portion in FIG. 5, but in an actual sheet-shaped aluminum porous body, the respective surfaces are thought to be similar.

In order to prepare such an electrode of the present invention, it is preferred to supply an enough amount of the active material for covering the skeleton of the aluminum porous body in the slurry filling step shown in FIG. 1.

——Aspect of <3-2>——

As shown in FIG. 1, in order to prepare an electrode from the aluminum porous body, filling of the active material (shown as a slurry filling step D in FIG. 1) is performed, and then the aluminum porous body is formed into an electrode undergoing a drying step and a compressing step. In this case, when the ability of a binder filled into the aluminum porous body together with the active material is insufficient, the active material tends to be easily exfoliated from the surface of the electrode and a micro short circuit easily tends to occur after completion of the electrode.

Figure 6:
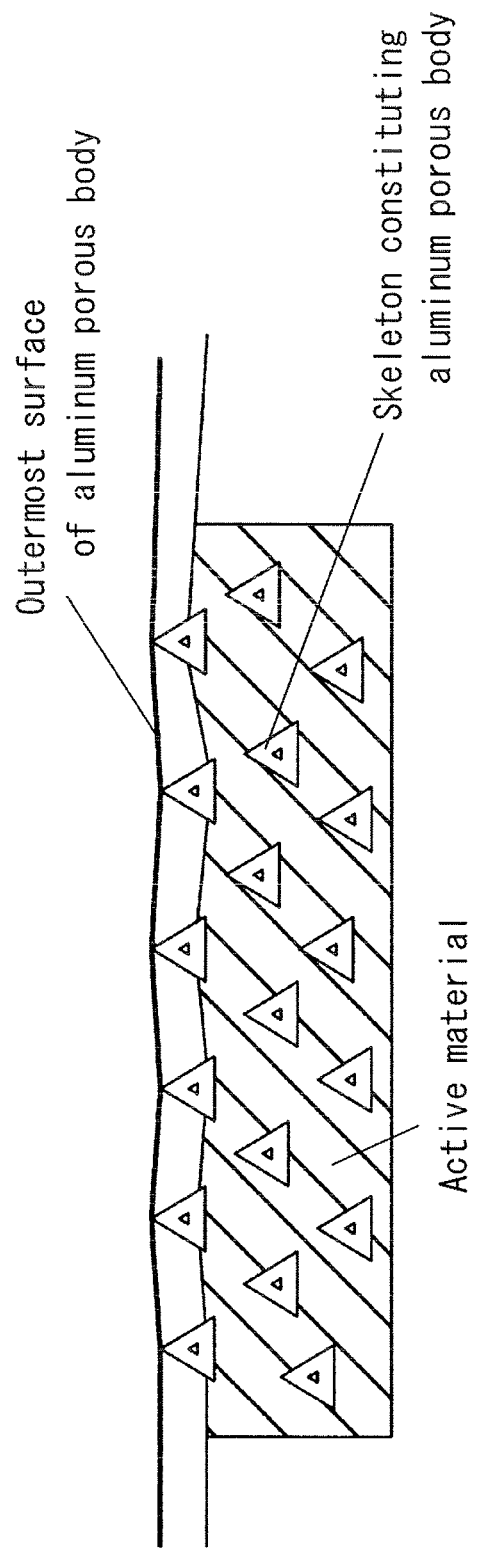
FIG. 6 is a schematic sectional view showing a state in which an active material is not exposed from the surface of an active material.

Therefore, in the electrode of the present invention, as shown in FIG. 6, it is preferred that the active material is not present in a portion from the outermost surface to a depth of 0.02 mm of the three-dimensional network aluminum porous body as a base material. Thereby, an electrode, in which the active material is adequately held within the electrode and is not exfoliated from the surface of the electrode, and a micro short circuit does not occur, can be provided.

In addition, the outermost surface of the aluminum porous body, as described above, refers to a plane obtained by passing through each apex of the skeleton in the outermost portion of the aluminum porous body. Since FIG. 6 is a conceptional view, the outermost surface of the aluminum porous body is shown in only an upper portion in FIG. 6 and other portions are covered with the active material, but in an actual sheet-shaped aluminum porous body, the respective surfaces are thought to be similar.

In order to prepare such an electrode of the present invention, a method of scooping the active material out from the surface of the electrode with a brush after the compressing step F shown in FIG. 1 can be exemplified.

Hereinafter, a method for producing the three-dimensional network aluminum porous body of the present invention will be described. Hereinafter, the production method will be described with reference to the drawings if necessary, taking an example in which an aluminum plating method is applied as a method of forming an aluminum film on the surface of a resin molded body made of polyurethane for a representative example. Throughout the reference figures hereinafter, the parts assigned the same number are the same parts or the corresponding parts. The present invention is not limited thereto but is defined by the claims, and all modifications which fall within the scope of the claims and the equivalents thereof are intended to be embraced by the claims.
(Step of Producing Aluminum Structure)

Figure 7:
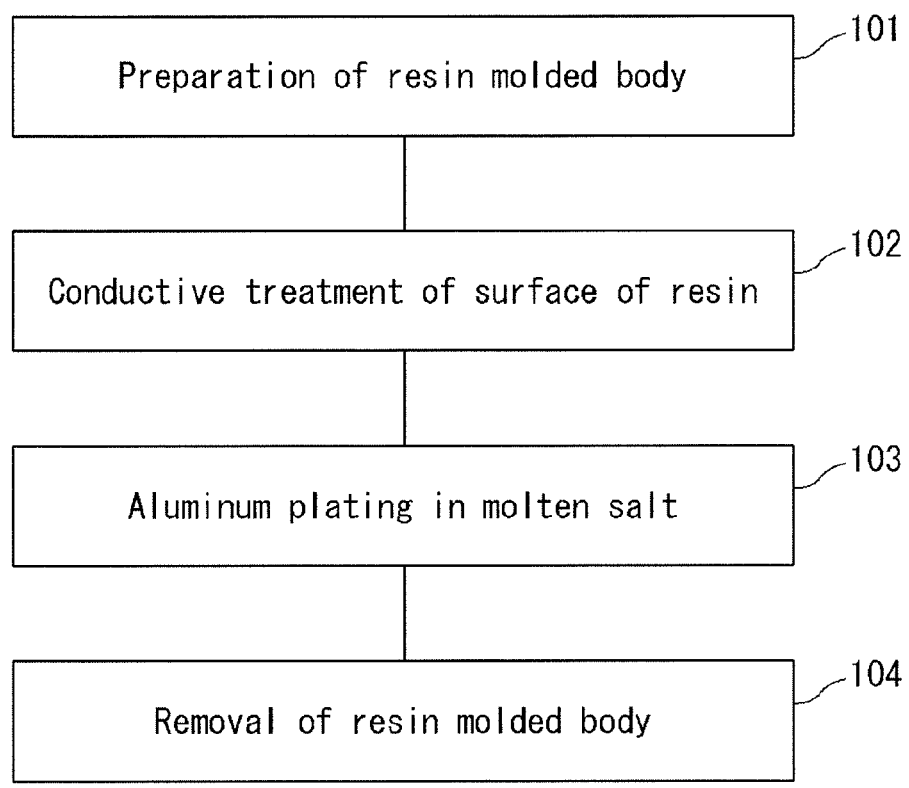
FIG. 7 is a flow chart showing a step of producing an aluminum structure according to the present invention.
Figure 8A:
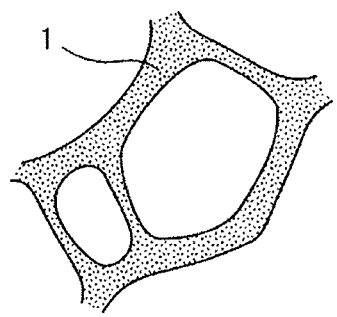
FIGS. 8A, 8B, 8C and 8D are schematic sectional views illustrating a step of producing an aluminum structure according to the present invention.
Figure 8B:
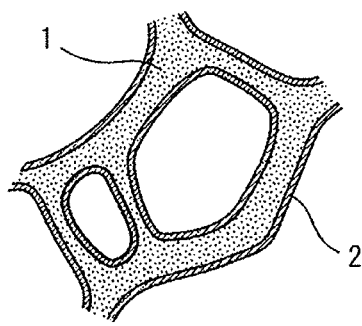

FIG. 7 is a flow chart showing a step of producing an aluminum structure. FIGS. 8A, 8B, 8C and 8D show schematic views of the formation of an aluminum plating film using a resin molded body as a core material corresponding to the flow chart. The overall flow of the production step will be described with reference to both figures. First, preparation 101 of a resin molded body serving as a base material is performed. FIG. 8A is an enlarged schematic view of the surface of a resin molded body having continuous pores as an example of a resin molded body serving as a base material. Pores are formed in the skeleton of a resin molded body 1. Next, a conductive treatment 102 of the surface of the resin molded body is performed. As illustrated in FIG. 8B, through this step, a thin conductive layer 2 made of an electric conductor is formed on the surface of the resin molded body 1.

Figure 8C:
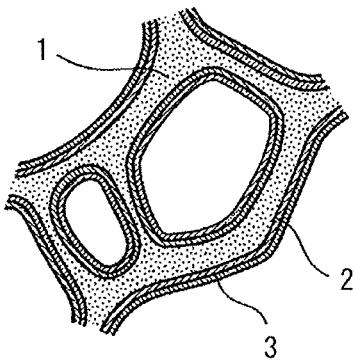
Figure 8D:
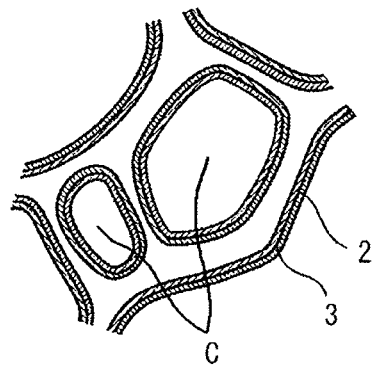

Subsequently, aluminum plating 103 in a molten salt is performed to form an aluminum plated layer 3 on the surface of the conductive layer of the resin molded body (FIG. 8C). Thereby, an aluminum structure is obtained in which the aluminum plated layer 3 is formed on the surface of the resin molded body serving as a base material. Removal 104 of the resin molded body serving as the base material is performed.

The resin molded body 1 can be removed by decomposition or the like to obtain an aluminum structure (porous body) containing only a remaining metal layer (FIG. 8D) including cells C. Hereinafter, each of these steps will be described in turn.
(Preparation of Resin Molded Body)

A resin molded body having a three-dimensional network structure and continuous pores is prepared. A material of the resin molded body may be any resin. As the material, a resin foam molded body made of polyurethane, melamine resins, polypropylene or polyethylene can be exemplified. Though the resin foam molded body has been exemplified, a resin molded body having any shape may be selected as long as the resin molded body has continuous pores. For example, a resin molded body having a shape like a nonwoven fabric formed by tangling fibrous resin can be used in place of the resin foam molded body. The resin foam molded body preferably has a porosity of 80% to 98% and a pore diameter of 50 μm to 500 μm. Urethane foams and melamine resin foams have a high porosity, continuity of pores, and excellent thermal decomposition properties and therefore they can be preferably used as the resin foam molded body.

Urethane foams are preferred in points of uniformity of pores, easiness of availability and the like, and preferred in that urethane foams with a small pore diameter can be available.

Figure 9:
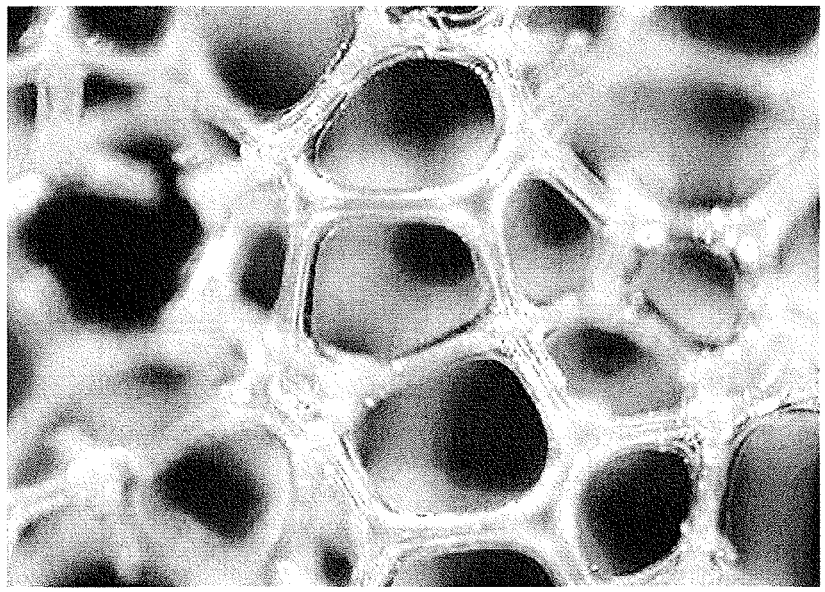
FIG. 9 is an enlarged photograph of the surface of the structure of a resin molded body made of polyurethane.

Resin molded bodies often contain residue materials such as a foaming agent and an unreacted monomer in the production of the foam, and are therefore preferably subjected to a washing treatment for the sake of the subsequent steps. As an example of the resin molded body, a urethane foam subjected to a washing treatment as a preliminary treatment is shown in FIG. 9. In the resin molded body, a three-dimensional network is configured as a skeleton, and therefore continuous pores are configured as a whole. The skeleton of the urethane foam has an almost triangular shape in a cross section perpendicular to its extending direction. Herein, the porosity is defined by the following equation:

Porosity=(1−(mass of porous material [g]/(volume of porous material [cm$^3$]×material density)))×100 [%]

Further, the pore diameter is determined by magnifying the surface of the resin molded body in a photomicrograph or the like, counting the number of pores per inch (25.4 mm) as the number of cells, and calculating an average pore diameter by the following equation: average pore diameter=25.4 mm/the number of cells.
(Conductive Treatment of Surface of Resin Molded Body)

In order to perform electroplating, the surface of the resin foam is previously subjected to a conductive treatment. A method of the conductive treatment is not particularly limited as long as it is a treatment by which a layer having a conductive property can be disposed on the surface of the resin molded body, and any method, including electroless plating of a conductive metal such as nickel, vapor deposition and sputtering of aluminum or the like, and application of a conductive coating material containing conductive particles such as carbon, may be selected.
(Formation of Aluminum Layer: Molten Salt Plating)

Next, an aluminum-plated layer is formed on the surface of the resin molded body by electroplating in a molten salt. By plating aluminum in the molten salt bath, a thick aluminum layer can be uniformly formed particularly on the surface of a complicated skeleton structure like the resin molded body having a three-dimensional network structure. A direct current is applied between a cathode of the resin molded body having a surface subjected to the conductive treatment and an anode of an aluminum plate with a purity of 99.0% in the molten salt. As the molten salt, an organic molten salt which is a eutectic salt of an organic halide and an aluminum halide or an inorganic molten salt which is a eutectic salt of an alkaline metal halide and an aluminum halide may be used. Use of an organic molten salt bath which melts at a relatively low temperature is preferred because it allows plating without the decomposition of the resin molded body, a base material. As the organic halide, an imidazolium salt, a pyridinium salt or the like may be used, and specifically, 1-ethyl-3-methylimidazolium chloride (EMIC) and butylpyridinium chloride (BPC) are preferred. Since the contamination of the molten salt with water or oxygen causes degradation of the molten salt, plating is preferably performed in an atmosphere of an inert gas, such as nitrogen or argon, and in a sealed environment.

The molten salt bath is preferably a molten salt bath containing nitrogen, and particularly an imidazolium salt bath is preferably used. In the case where a salt which melts at a high temperature is used as the molten salt, the dissolution or decomposition of the resin in the molten salt is faster than the growth of a plated layer, and therefore, a plated layer cannot be formed on the surface of the resin molded body. The imidazolium salt bath can be used without having any affect on the resin even at relatively low temperatures. As the imidazolium salt, a salt which contains an imidazolium cation having alkyl groups at 1,3-position is preferably used, and particularly, aluminum chloride+1-ethyl-3-methylimidazolium chloride (AlCl$_3$+EMIC)-based molten salts are most preferably used because of their high stability and resistance to decomposition. The imidazolium salt bath allows plating of urethane resin foams and melamine resin foams, and the temperature of the molten salt bath ranges from 10° C. to 65° C., and preferably 25° C. to 65° C. With a decrease in temperature, the current density range where plating is possible is narrowed, and plating of the entire surface of a porous body becomes difficult. The failure that a shape of a base resin is impaired tends to occur at a high temperature higher than 65° C.

With respect to molten salt aluminum plating on a metal surface, it is reported that an additive, such as xylene, benzene, toluene or 1,10-phenanthroline, is added to $AlCl_3$-EMIC for the purpose of improving the smoothness of the plated surface. The present inventors have found that particularly in aluminum plating of a resin molded body having a three-dimensional network structure, the addition of 1,10-phenanthroline has characteristic effects on the formation of an aluminum porous body. That is, it provides a first characteristic that the aluminum skeleton forming the porous body is hardly broken, and a second characteristic that uniform plating can be achieved with a small difference in plating thickness between the surface and the interior of the porous body.

In the case of pressing the completed aluminum porous body or the like, the above-mentioned two characteristics of the hard-to-break skeleton and the uniform plating thickness in the interior and exterior can provide a porous body which has a hard-to-break skeleton as a whole and is uniformly pressed. When the aluminum porous body is used as an electrode material for batteries or the like, it is performed that an electrode is filled with an electrode active material and is pressed to increase its density. However, since the skeleton is often broken in the step of filling the active material or pressing, the two characteristics are extremely effective in such an application.

According to the above description, the addition of an organic solvent to the molten salt bath is preferred, and particularly 1,10-phenanthroline is preferably used. The amount of the organic solvent added to the plating bath preferably ranges from 0.2 to 7 g/L. When the amount is 0.2 g/L or less, the resulting plating is poor in smoothness and brittle, and it is difficult to achieve an effect of decreasing a difference in thickness between the surface layer and the interior. When the amount is 7 g/L or more, plating efficiency is decreased and it is difficult to achieve a predetermined plating thickness.

Figure 10:
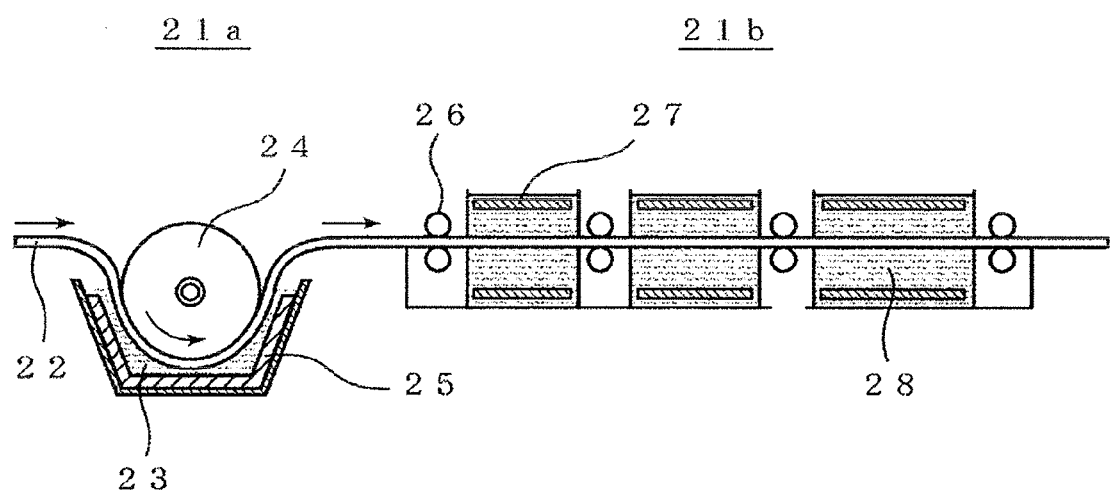
FIG. 10 is a view illustrating an example of a step of continuous aluminum plating utilizing molten salt plating.

FIG. 10 is a view schematically showing the configuration of an apparatus for continuously plating the above-mentioned strip-shaped resin with aluminum. This view shows a configuration in which a strip-shaped resin 22 having a surface subjected to a conductive treatment is transferred from the left to the right in the figure. A first plating bath 21a is configured by a cylindrical electrode 24, an aluminum anode 25 disposed on the inner wall of a container, and a plating bath 23. The strip-shaped resin 22 passes through the plating bath 23 along the cylindrical electrode 24, and thereby a uniform electric current can easily flow through the entire resin molded body, and uniform plating can be achieved. A plating bath 21b is a bath for further performing thick uniform plating and is configured by a plurality of baths so that plating can be performed multiple times. The strip-shaped resin 22 having a surface subjected to a conductive treatment passes through a plating bath 28 while being transferred by electrode rollers 26, which function as feed rollers and power feeding cathodes on the outside of the bath, to thereby perform plating. The plurality of baths include anodes 27 made of aluminum facing both faces of the resin molded body via the plating bath 28, which allows more uniform plating on both faces of the resin molded body. A plating liquid is adequately removed from the plated aluminum porous body by nitrogen gas blowing and then the plated aluminum porous body is washed with water to obtain an aluminum porous body.

On the other hand, an inorganic salt bath can also be used as a molten salt to an extent to which a resin is not melted or the like. The inorganic salt bath is a salt of a two-component system, typically $AlCl_3$-XCl (X: alkali metal), or a multi-component system. Such an inorganic salt bath usually has a higher molten temperature than that salt bath like an imidazolium salt bath, but it has less environmental constraints such as water content or oxygen and can be put to practical use at low cost as a whole. When the resin is a melamine resin foam, an inorganic salt bath at 60° C. to 150° C. is employed because the resin can be used at a higher temperature than a urethane resin foam.

An aluminum structure having a resin molded body as the core of its skeleton is obtained through the above-mentioned steps. For some applications such as various filters and a catalyst support, the aluminum structure may be used as a resin-metal composite as it is, but when the aluminum structure is used as a metal porous body without a resin because of constraints resulting from the usage environment, the resin is removed. In the present invention, in order to avoid causing the oxidation of aluminum, the resin is removed through decomposition in a molten salt described below.

(Removal of Resin: Treatment by Molten Salt)

The decomposition in a molten salt is performed in the following manner. A porous resin molded body having an aluminum plated layer formed on the surface thereof is dipped in a molten salt, and is heated while applying a negative potential (potential lower than a standard electrode potential of aluminum) to the aluminum layer to remove the resin molded body. When the negative potential is applied to the aluminum layer with the resin molded body dipped in the molten salt, the resin molded body can be decomposed without oxidizing aluminum. A heating temperature can be appropriately selected in accordance with the type of the resin molded body. When the resin molded body is urethane, a temperature of the molten salt bath needs to be 380° C. or higher since decomposition of urethane occurs at about 380° C., but the treatment needs to be performed at a temperature equal to or lower than the melting point (660° C.) of aluminum in order to avoid melting aluminum. A preferred temperature range is 500° C. or higher and 600° C. or lower. A negative potential to be applied is on the minus side of the reduction potential of aluminum and on the plus side of the reduction potential of the cation in the molten salt. In this manner, an aluminum porous body which has continuous pores, and has a thin oxide layer on the surface and a low oxygen content can be obtained.

The molten salt used in the decomposition of the resin may be a halide salt of an alkali metal or alkaline earth metal such that the aluminum electrode potential is lower. More specifically, the molten salt preferably contains one or more salts selected from the group consisting of lithium chloride (LiCl), potassium chloride (KCl), and sodium chloride (NaCl). In this manner, an aluminum porous body which has continuous pores, and has a thin oxide layer on the surface and a low oxygen content can be obtained.

Next, a process for producing an electrode from the aluminum porous body thus obtained will be described.

FIG. 1 is a view illustrating an example of a process for continuously producing an electrode from an aluminum porous body. The process includes a porous body sheet winding off step A of winding off a porous body sheet from a winding off roller 41, a thickness adjustment step B using a compressing roller 42, a lead welding step C using a compressing/welding roller 43 and a lead supply roller 49, a slurry filling step D using a filling roller 44, a slurry supply nozzle 50 and a slurry 51, a drying step E using a drying machine 45, a compressing step F using a compressing roller 46, a cutting step G using a cutting roller 47, and a wind-up step H using a wind-up roller 48. Hereinafter, these steps will be described specifically.

(Thickness Adjustment Step)

An aluminum porous body sheet is wound off from a raw sheet roll around which the sheet of an aluminum porous body has been wound and is adjusted so as to have an optimum thickness and a flat surface by roller pressing in the thickness adjustment step. The final thickness of the aluminum porous body is appropriately determined in accordance with an application of an electrode, and this thickness adjustment step is a precompressing step of a compressing step for achieving the final thickness and compresses the aluminum porous body to a level of thickness at which a treatment in the following step is easily performed. A flat-plate press or a roller press is used as a pressing machine. The flat-plate press is preferable for suppressing the elongation of a current collector, but is not suitable for mass production, and therefore roller press capable of continuous treatment is preferably used.

(Lead Welding Step)

—Compression of End Part of Aluminum Porous Body—

When the aluminum porous body is used as an electrode current collector of a secondary battery or the like, a tab lead for external extraction needs to be welded to the aluminum porous body. In the case of an electrode using the aluminum porous body, since a robust metal part is not present in the aluminum porous body, it is impossible to weld a lead piece directly to the aluminum porous body. Therefore, an end part of the aluminum porous body is processed into the form of foil by compressing to impart mechanical strength thereto, and a tab lead is welded to the part.

An example of a method of processing the end part of the aluminum porous body will be described.

Figure 11:
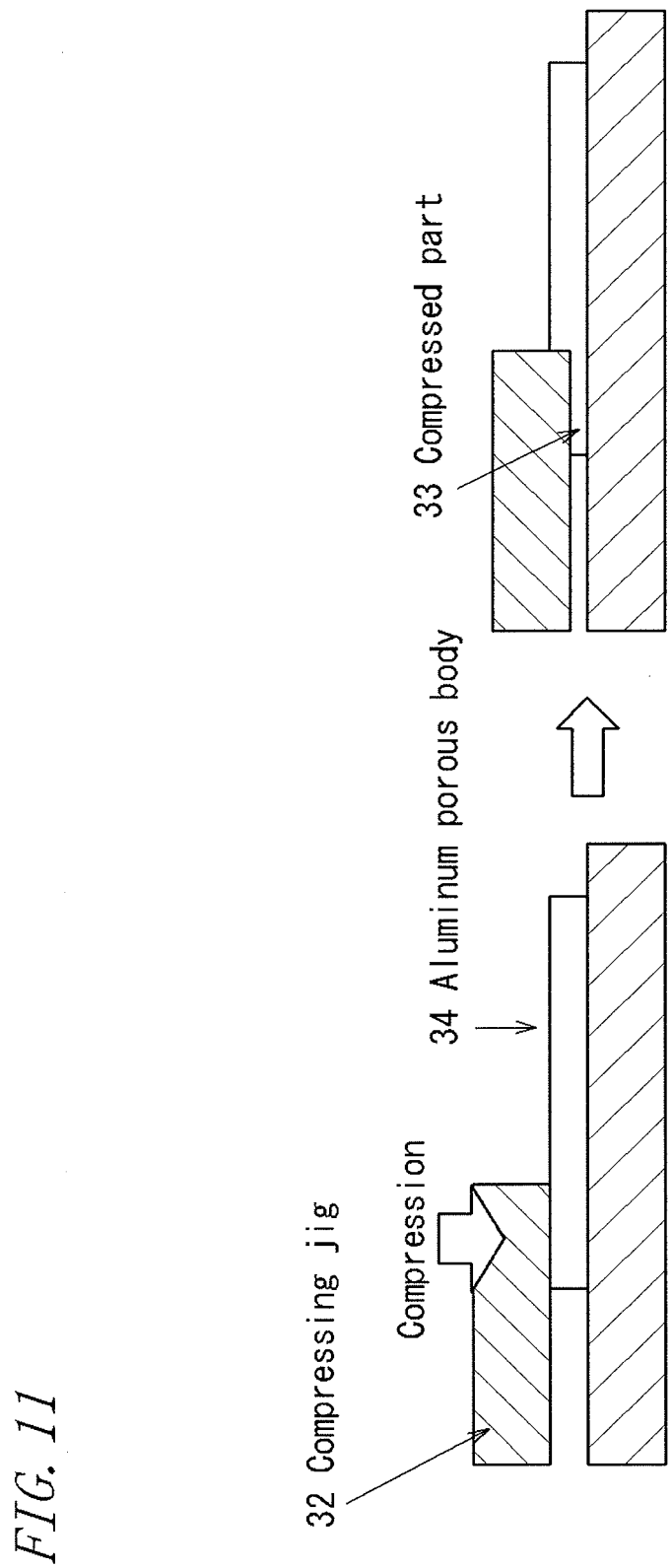
FIG. 11 is a view showing a step of compressing an end part of an aluminum porous body to form a compressed part.

FIG. 11 is a view schematically showing the compressing step.

A rotating roller can be used as a compressing jig.

When the compressed part has a thickness of 0.05 mm or more and 0.2 mm or less (for example, about 0.1 mm), predetermined mechanical strength can be achieved.

Figure 12:
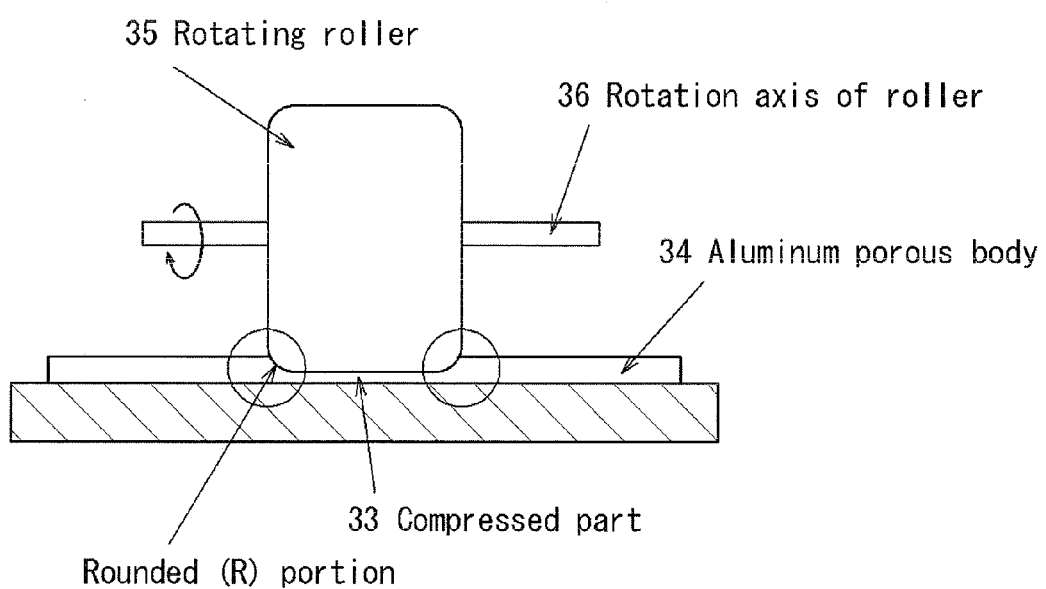
FIG. 12 is a view showing a step of compressing the central part of an aluminum porous body to form a compressed part.

In FIG. 12, the central part of an aluminum porous body 34 having a width of two aluminum porous bodies is compressed by a rotating roller 35 as a compressing jig to form a compressed part 33. After compression, the compressed part 33 is cut along the center line of the central part to obtain two sheets of electrode current collectors having a compressed part at the end of the current collector.

Further, a plurality of current collectors can be obtained by forming a plurality of strip-shaped compressed end parts at the central part of the aluminum porous body by using a plurality of rotating rollers, and cutting along the respective center lines of these strip-shaped compressed parts.

—Bonding of Tab Lead to Peripheral Portion of Electrode—

A tab lead is bonded to the compressed end part of the current collector thus obtained. It is preferred that a metal foil is used as a tab lead in order to reduce electric resistance of an electrode and the metal foil is bonded to the surface of at least one side of peripheries of the electrode. Further, in order to reduce electric resistance, welding is preferably employed as a bonding method. A width for welding a metal foil is preferably 10 mm or less since a too wide metal foil causes wasted space to increase in a battery and a capacity density of the battery is decreased. When the width for welding is too narrow, since welding becomes difficult and the effect of collecting a current is deteriorated, the width is preferably 1 mm or more.

As a method of welding, a method of resistance welding or ultrasonic welding can be used, but the ultrasonic welding is preferred because of its larger bonding area.

—Metal Foil—

A material of the metal foil is preferably aluminum in consideration of electric resistance and tolerance for an electrolytic solution. Further, since impurities in the metal foil causes the elution or reaction of the impurities in a battery, a capacitor or a lithium-ion capacitor, an aluminum foil having a purity of 99.99% or more is preferably used. The thickness of the welded part is preferably smaller than that of the electrode itself.

The aluminum foil is preferably made to have a thickness of 20 to 500 μm.

Welding of the metal foil may be performed before filling the current collector with an active material, or may be performed after the filling, but when the welding is performed before filling, the active material can be prevented from exfoliating. Particularly, in the case of ultrasonic welding, welding is preferably performed before filling. Moreover, an activated carbon paste may adhere to a welded portion, but since there is a possibility that the paste can be peeled off during the step, the welded portion is preferably masked in order to avoid filling the paste.

In addition, though in the above description, the compressing step of the end part and the bonding step of the tab lead have been described as separate steps, the compressing step and the bonding step may be performed simultaneously. In this case, a roller, in which a roller part to be brought into contact, as a compressing roller, with an end part for bonding a tab lead of the aluminum porous body sheet can perform resistance welding, is used, and the aluminum porous body sheet and the metal foil can be simultaneously supplied to the roller to perform compressing of the end part and metal foil welding to the compressed part simultaneously.

(Step of Filling Active Material)

An electrode is obtained by filling the current collector prepared as described above with an active material. The active material is appropriately selected in accordance with the purpose of use of the electrode.

For filling the active material, publicly known methods such as a method of filling by immersion and a coating method can be employed. Examples of the coating method include a roll coating method, an applicator coating method, an electrostatic coating method, a powder coating method, a spray coating method, a spray coater coating method, a bar coater coating method, a roll coater coating method, a dip coater coating method, a doctor blade coating method, a wire bar coating method, a knife coater coating method, a blade coating method, and a screen printing method.

When the active material is filled, a conduction aid or a binder is added as required, and an organic solvent is mixed therewith to prepare a slurry, and the prepared slurry is filled into the aluminum porous body by using the above-mentioned filling method.

Figure 13:
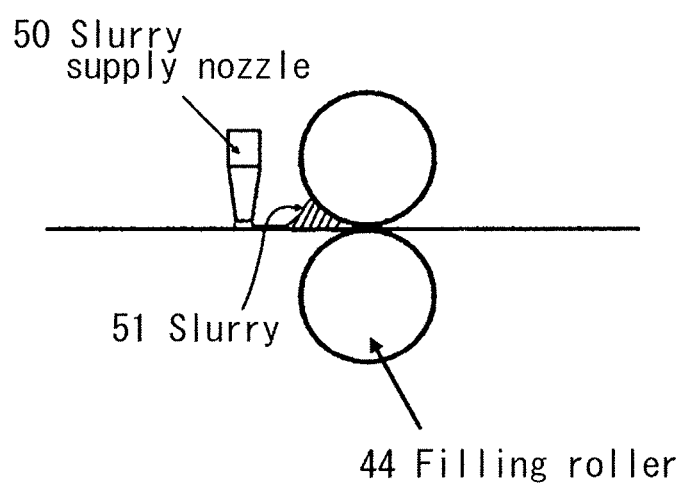
FIG. 13 is a view showing a step of filling a porous part of an aluminum porous body with an active material slurry.

FIG. 13 shows a method of filling a porous body with a slurry by a roll coating method. As shown in the figure, the slurry is supplied onto a porous body sheet and this sheet is passed between a pair of rotating rollers opposed to each other at a predetermined interval. The slurry is pressed and filled into the porous body when passing between the rotating rollers.

(Drying Step)

The porous body filled with the active material is transferred to a drying machine and heated to evaporate/remove the organic solvent and thereby an electrode material having the active material fixed in the porous body is obtained.

(Compressing Step)

The dried electrode material is compressed to a final thickness in the compressing step. A flat-plate press or a roller press is used as a pressing machine. The flat-plate press is preferable for suppressing the elongation of a current collector, but is not suitable for mass production, and therefore roller press capable of continuous treatment is preferably used.

A case of compressing by roller pressing is shown in the compressing step F of FIG. 1.

(Cutting Step)

In order to improve the ability of mass production of the electrode material, it is preferred that the width of a sheet of the aluminum porous body is set to the width of a plurality of final products and the sheet is cut along its traveling direction with a plurality of blades to form a plurality of long sheets of electrode materials. This cutting step is a step of dividing a long length of electrode material into a plurality of long lengths of electrode materials.

(Winding-Up Step)

This step is a step of winding up the plurality of long sheets of electrode materials obtained in the above-mentioned cutting step around a wind-up roller.

Next, applications of the electrode material obtained in the above-mentioned step will be described.

Examples of main applications of the electrode material in which the aluminum porous body is used as a current collector include electrodes for nonaqueous electrolyte batteries such as a lithium battery and a molten salt battery, an electrode for a capacitor with a nonaqueous electrolytic solution, and a lithium-ion capacitor with a nonaqueous electrolytic solution.

Hereinafter, these applications will be described.

(Lithium Battery)

Next, an electrode material for batteries using an aluminum porous body and a battery will be described below. For example, when an aluminum porous body is used in a positive electrode of a lithium battery (including a lithium-ion secondary battery), lithium cobalt oxide ($LiCoO_2$), lithium manganese oxide ($LiMn_2O_4$), lithium nickel dioxide ($LiNiO_2$) or the like is used as an active material. The active material is used in combination with a conduction aid and a binder.

In a conventional positive electrode material for lithium batteries, an electrode formed by applying an active material to the surface of an aluminum foil is used. Though a lithium battery has a higher capacity than a nickel-metal hydride battery or a capacitor, a further increase in capacity is required in automobile applications. Therefore, in order to increase a battery capacity per unit area, the application thickness of the active material is increased. Further, in order to effectively utilize the active material, the active material needs to be in electrical contact with the aluminum foil, a current collector, and therefore, the active material is mixed with a conduction aid to be used.

In contrast, the aluminum porous body according to the present invention has a high porosity and a large surface area per unit area. Thus, a contact area between the current collector and the active material is increased, and therefore, the active material can be effectively utilized, the battery capacity can be improved, and the amount of the conduction aid to be mixed can be decreased. In a lithium battery, the above-mentioned positive electrode materials are used for a positive electrode, and for a negative electrode, a foil, a punched metal or a porous body of copper or nickel is used as a current collector and a negative electrode active material such as graphite, lithium titanium oxide ($Li_4Ti_5O_{12}$), an alloy of Sn or Si, lithium metal or the like is used. The negative electrode active material is also used in combination with a conduction aid and a binder.

Such a lithium battery can have an increased capacity even with a small electrode area and accordingly have a higher energy density than a conventional lithium battery using an aluminum foil. The effects of the present invention in a secondary battery has been mainly described above, but the effects of the present invention in a primary battery is the same as that in the secondary battery, and a contact area is increased when the aluminum porous body is filled with the active material and a capacity of the primary battery can be improved.

(Configuration of Lithium Battery)

An electrolyte used in a lithium battery includes a nonaqueous electrolytic solution and a solid electrolyte.

Figure 14:
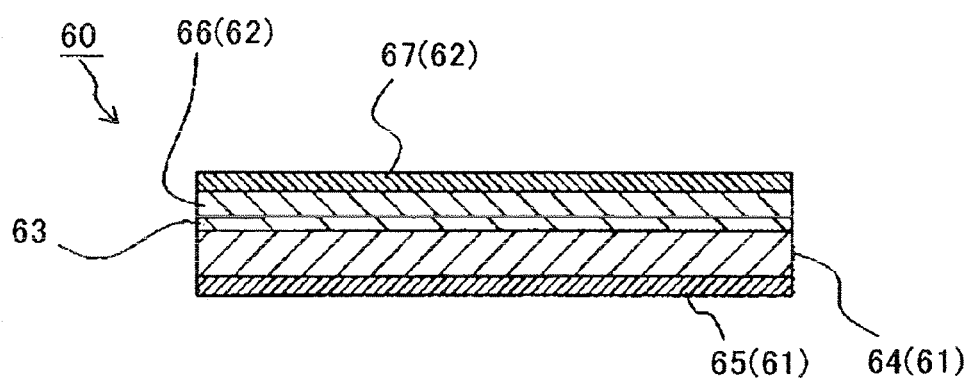
FIG. 14 is a schematic view showing an example of a structure in which an aluminum porous body is applied to a lithium battery.

FIG. 14 is a vertical sectional view of a solid-state lithium battery using a solid electrolyte. A solid-state lithium battery 60 includes a positive electrode 61, a negative electrode 62, and a solid electrolyte layer (SE layer) 63 disposed between both electrodes. The positive electrode 61 includes a positive electrode layer (positive electrode body) 64 and a current collector 65 of positive electrode, and the negative electrode 62 includes a negative electrode layer 66 and a current collector 67 of negative electrode.

As the electrolyte, a nonaqueous electrolytic solution described later is used besides the solid electrolyte. In this case, a separator (porous polymer film, nonwoven fabric, paper or the like) is disposed between both electrodes, and both electrodes and separator are impregnated with the nonaqueous electrolytic solution.

(Active Material Filled into Aluminum Porous Body)

When an aluminum porous body is used in a positive electrode of a lithium battery, a material that can extract/insert lithium can be used as an active material, and an aluminum porous body filled with such a material can provide an electrode suitable for a lithium secondary battery. As the material of the positive electrode active material, for example, lithium cobalt oxide ($LiCoO_2$), lithium nickel dioxide ($LiNiO_2$), lithium cobalt nickel oxide ($LiCo_{0.3}Ni_{0.7}O_2$), lithium manganese oxide ($LiMn_2O_4$), lithium titanium oxide ($Li_4Ti_5O_{12}$), lithium manganese oxide compound ($LiM_yMn_{2-y}O_4$); M=Cr, Co, Ni) or lithium acid is used. The active material is used in combination with a conduction aid and a binder. Examples of the material of the positive electrode active material include transition metal oxides such as conventional lithium iron phosphate and olivine compounds which are compounds ($LiFePO_4$, $LiFe_{0.5}Mn_{0.5}PO_4$) of the lithium iron phosphate. Further, the transition metal elements contained in these materials may be partially substituted with another transition metal element.

Moreover, examples of other positive electrode active material include lithium metals in which the skeleton is a sulfide-based chalcogenide such as $TiS_2$, $V_2S_3$, FeS, $FeS_2$ or $LiMS_x$ (M is a transition metal element such as Mo, Ti, Cu, Ni, or Fe, or Sb, Sn or Pb), and a metal oxide such as $TiO_2$, $Cr_3O_8$, $V_2O_5$ or $MnO_2$. Herein, the above-mentioned lithium titanium oxide ($Li_4Ti_5O_{12}$) can also be used as a negative electrode active material.

(Electrolytic Solution Used in Lithium Battery)

A nonaqueous electrolytic solution is used in a polar aprotic organic solvent, and specific examples of the nonaqueous electrolytic solution include ethylene carbonate, diethyl carbonate, dimethyl carbonate, propylene carbonate, γ-butyrolactone and sulfolane. As a supporting salt, lithium tetrafluoroborate, lithium hexafluorophosphate, an imide salt or the like is used. The concentration of the supporting salt serving as an electrolyte is preferably higher, but a supporting salt having a concentration of about 1 mol/L is generally used since there is a limit of dissolution.

(Solid Electrolyte Filled into Aluminum Porous Body)

The aluminum porous body may be additionally filled with a solid electrolyte besides the active material. The aluminum porous body can be suitable for an electrode of a solid-state lithium battery by filling the aluminum porous body with the active material and the solid electrolyte. However, the ratio of the active material to materials filled into the aluminum porous body is preferably adjusted to 50 mass % or more and more preferably 70 mass % or more from the viewpoint of ensuring a discharge capacity.

A sulfide-based solid electrolyte having high lithium ion conductivity is preferably used for the solid electrolyte, and examples of the sulfide-based solid electrolyte include sulfide-based solid electrolytes containing lithium, phosphorus and sulfur. The sulfide-based solid electrolyte may further contain an element such as O, Al, B, Si or Ge.

Such a sulfide-based solid electrolyte can be obtained by a publicly known method. Examples of a method of forming the sulfide-based solid electrolyte include a method in which lithium sulfide ($Li_2S$) and diphosphorus pentasulfide ($P_2S_5$) are prepared as starting materials, $Li_2S$ and $P_2S_5$ are mixed in proportions of about 50:50 to about 80:20 in terms of mole ratio, and the resulting mixture is fused and quenched (melting and rapid quenching method) and a method of mechanically milling the quenched product (mechanical milling method).

The sulfide-based solid electrolyte obtained by the above-mentioned method is amorphous. The sulfide-based solid electrolyte can also be utilized in this amorphous state, but it may be subjected to a heat treatment to form a crystalline sulfide-based solid electrolyte. It can be expected to improve lithium ion conductivity by this crystallization.

(Filling of Active Material into Aluminum Porous Body)

For filling the active material (active material and solid electrolyte), publicly known methods such as a method of filling by immersion and a coating method can be employed. Examples of the coating method include a roll coating method, an applicator coating method, an electrostatic coating method, a powder coating method, a spray coating method, a spray coater coating method, a bar coater coating method, a roll coater coating method, a dip coater coating method, a doctor blade coating method, a wire bar coating method, a knife coater coating method, a blade coating method, and a screen printing method.

When the active material (active material and solid electrolyte) is filled, for example, a conduction aid or a binder is added as required, and an organic solvent or water is mixed therewith to prepare a slurry of a positive electrode mixture. An aluminum porous body is filled with this slurry by the above-mentioned method. As the conduction aid, for example, carbon black such as acetylene black (AB) or Ketjen Black (KB), or carbon fibers such as carbon nano tubes (CNT) may be used. As the binder, for example, polyvinylidene fluoride (PVDF), polytetrafluoroethylene (PTFE), polyvinyl alcohol (PVA), carboxymethyl cellulose (CMC), xanthan gum and the like can be used.

The organic solvent used in preparing the slurry of a positive electrode mixture can be appropriately selected as long as it does not adversely affect materials (i.e., an active material, a conduction aid, a binder, and a solid electrolyte as required) to be filled into the aluminum porous body. Examples of the organic solvent include n-hexane, cyclohexane, heptane, toluene, xylene, trimethylbenzene, dimethyl carbonate, diethyl carbonate, ethyl methyl carbonate, propylene carbonate, ethylene carbonate, butylene carbonate, vinylene carbonate, vinyl ethylene carbonate, tetrahydrofuran, 1,4-dioxane, 1,3-dioxolane, ethylene glycol, and N-methyl-2-pyrrolidone. Further, when water is used as a solvent, a surfactant may be used for enhancing filling performance.

In addition, in a conventional positive electrode material for lithium batteries, an electrode is formed by applying an active material onto the surface of an aluminum foil. In order to increase a battery capacity per unit area, the application thickness of the active material is increased. Further, in order to effectively utilize the active material, the active material needs to be in electrical contact with the aluminum foil, and therefore, the active material is mixed with a conduction aid to be used. In contrast, the aluminum porous body according to the present invention has a high porosity and a large surface area per unit area. Thus, a contact area between the current collector and the active material is increased, and therefore, the active material can be effectively utilized, the battery capacity can be improved, and the amount of the conduction aid to be mixed can be decreased.

(Electrode for Capacitor)

Figure 15:
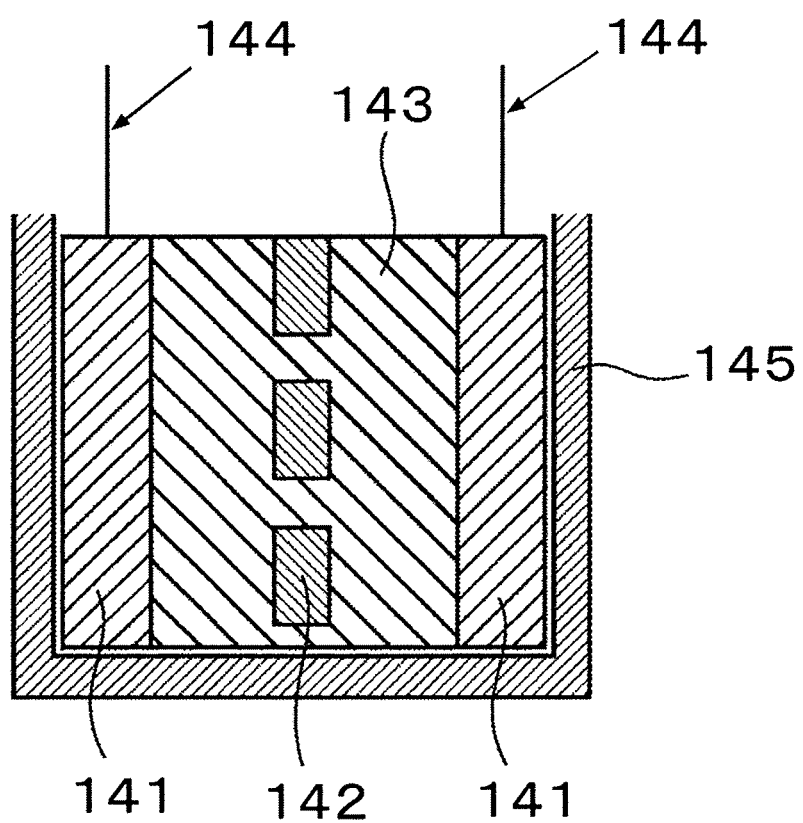
FIG. 15 is a schematic view showing an example of a structure in which an aluminum porous body is applied to a capacitor with a nonaqueous electrolytic solution.

FIG. 15 is a schematic sectional view showing an example of a capacitor produced by using the electrode material for a capacitor. An electrode material formed by supporting an electrode active material on an aluminum porous body is disposed as a polarizable electrode 141 in an organic electrolyte 143 partitioned with a separator 142. The polarizable electrode 141 is connected to a lead wire 144, and all these components are housed in a case 145. When the aluminum porous body is used as a current collector, the surface area of the current collector is increased and a contact area between the current collector and activated carbon as an active material is increased, and therefore, a capacitor that can realize a high output and a high capacity can be obtained.

In order to produce an electrode for a capacitor, a current collector of the aluminum porous body is filled with the activated carbon as an active material. The activated carbon is used in combination with a conduction aid or a binder.

In order to increase the capacity of the capacitor, the amount of the activated carbon as a main component is preferably in a large amount, and the amount of the activated carbon is preferably 90% or more in terms of the composition ratio after drying (after removing a solvent). The conduction aid and the binder are necessary, but the amounts thereof are preferably as small as possible because they are causes of a reduction in capacity and further the binder is a cause of an increase in internal resistance. Preferably, the amount of the conduction aid is 10 mass % or less and the amount of the binder is 10 mass % or less.

When the surface area of the activated carbon is larger, the capacity of the capacitor is larger, and therefore, the activated carbon preferably has a specific surface area of 1000 $m^2/g$ or more. As a material of the activated carbon, a plant-derived palm shell, a petroleum-based material or the like may be used. In order to increase the surface area of the activated carbon, the material is preferably activated by use of steam or alkali.

The electrode material predominantly composed of the activated carbon is mixed and stirred to obtain an activated carbon paste. This activated carbon paste is filled into the above-mentioned current collector and dried, and its density is increased by compressing with a roller press or the like as required to obtain an electrode for a capacitor.

(Filling of Activated Carbon into Aluminum Porous Body)

For filling of the activated carbon, publicly known methods such as a method of filling by immersion and a coating method can be employed. Examples of the coating method include a roll coating method, an applicator coating method, an electrostatic coating method, a powder coating method, a spray coating method, a spray coater coating method, a bar coater coating method, a roll coater coating method, a dip coater coating method, a doctor blade coating method, a wire bar coating method, a knife coater coating method, a blade coating method, and a screen printing method.

When the activated carbon is filled, for example, a conduction aid or a binder is added as required, and an organic solvent or water is mixed therewith to prepare a slurry of a positive electrode mixture. An aluminum porous body is filled with this slurry by the above-mentioned method. As the conduction aid, for example, carbon black such as acetylene black (AB) or Ketjen Black (KB), or carbon fibers such as carbon nano tubes (CNT) may be used. As the binder, for example, polyvinylidene fluoride (PVDF), polytetrafluoroethylene (PTFE), polyvinyl alcohol (PVA), carboxymethyl cellulose (CMC), xanthan gum and the like can be used.

The organic solvent used in preparing the slurry of a positive electrode mixture can be appropriately selected as long as it does not adversely affect materials (i.e., an active material, a conduction aid, a binder, and a solid electrolyte as required) to be filled into the aluminum porous body. Examples of the organic solvent include n-hexane, cyclohexane, heptane, toluene, xylene, trimethylbenzene, dimethyl carbonate, diethyl carbonate, ethyl methyl carbonate, propylene carbonate, ethylene carbonate, butylene carbonate, vinylene carbonate, vinyl ethylene carbonate, tetrahydrofuran, 1,4-dioxane, 1,3-dioxolane, ethylene glycol, and N-methyl-2-pyrrolidone. Further, when water is used as a solvent, a surfactant may be used for enhancing filling performance.

(Preparation of Capacitor)

The electrode obtained in the above-mentioned manner is punched out into an appropriate size to prepare two sheets, and these two electrodes are opposed to each other with a separator interposed therebetween. A porous film or nonwoven fabric made of cellulose or a polyolefin resin is preferably used for the separator. Then, the electrodes are housed in a cell case by use of required spacers, and impregnated with an electrolytic solution. Finally, a lid is put on the case with an insulating gasket interposed between the lid and the case and is sealed, and thereby an electric double layer capacitor can be prepared. When a nonaqueous material is used, materials of the electrode and the like are preferably adequately dried for decreasing the water content in the capacitor as much as possible. Preparation of the capacitor is performed in low-moisture environments, and sealing may be performed in reduced-pressure environments. In addition, the capacitor is not particularly limited as long as the current collector and the electrode of the present invention are used, and capacitors may be used which are prepared by a method other than this method.

Though as the electrolytic solution, both an aqueous system and a nonaqueous system can be used, the nonaqueous system is preferably used since its voltage can be set at a higher level than that of the aqueous system. In the aqueous system, potassium hydroxide or the like can be used as an electrolyte. Examples of the nonaqueous system include many ionic liquids in combination of a cation and an anion. As the cation, lower aliphatic quaternary ammonium, lower aliphatic quaternary phosphonium, imidazolium or the like is used, and as the anion, ions of metal chlorides, ions of metal fluorides, and imide compounds such as bis(fluorosulfonyl) imide and the like are known. Further, as the nonaqueous system, there is a polar aprotic organic solvent, and specific examples thereof include ethylene carbonate, diethyl carbonate, dimethyl carbonate, propylene carbonate, γ-butyrolactone and sulfolane. As a supporting salt in the nonaqueous electrolytic solution, lithium tetrafluoroborate, lithium hexafluorophosphate or the like is used.

(Lithium-Ion Capacitor)

Figure 16:
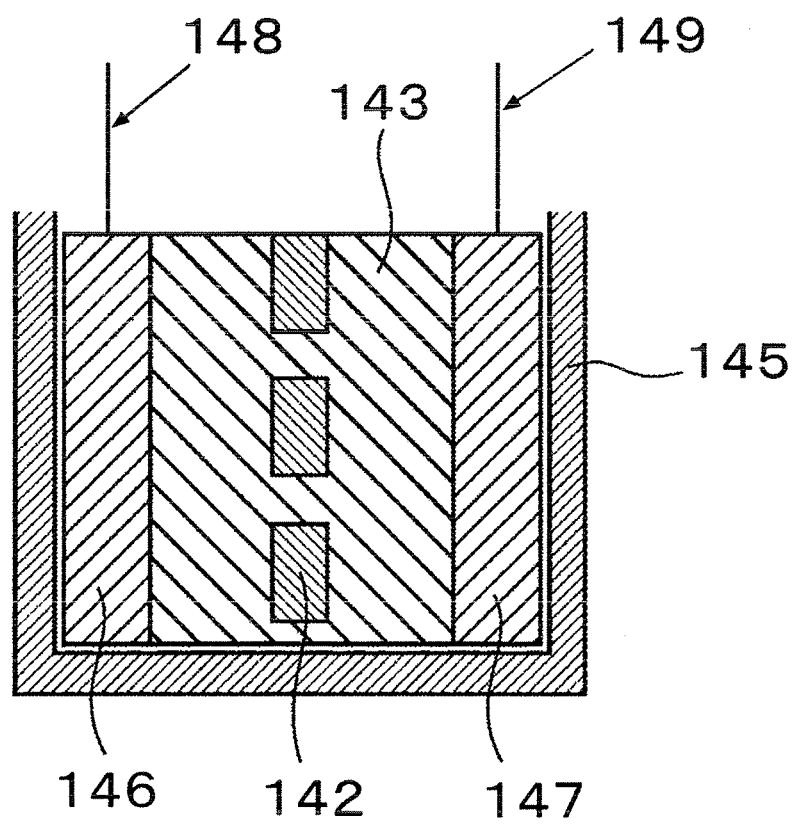
FIG. 16 is a schematic view showing an example of a structure in which an aluminum porous body is applied to a lithium-ion capacitor.

FIG. 16 is a schematic sectional view showing an example of a lithium-ion capacitor produced by using the electrode material for a lithium-ion capacitor. In an organic electrolytic solution 143 partitioned with a separator 142, an electrode material formed by supporting a positive electrode active material on an aluminum porous body is disposed as a positive electrode 146 and an electrode material formed by supporting a negative electrode active material on a current collector is disposed as a negative electrode 147. The positive electrode 146 and the negative electrode 147 are connected to a lead wire 148 and a lead wire 149, respectively, and all these components are housed in a case 145. When the aluminum porous body is used as a current collector, the surface area of the current collector is increased, and therefore, even when activated carbon as an active material is applied onto the aluminum porous body in a thin manner, a lithium-ion capacitor that can realize a high output and a high capacity can be obtained.

(Positive Electrode)

In order to produce an electrode for a lithium-ion capacitor, a current collector of the aluminum porous body is filled with activated carbon as an active material. The activated carbon is used in combination with a conduction aid or a binder.

In order to increase the capacity of the lithium-ion capacitor, the amount of the activated carbon as a main component is preferably in a large amount, and the amount of the activated carbon is preferably 90% or more in terms of the composition ratio after drying (after removing a solvent). The conduction aid and the binder are necessary, but the amounts thereof are preferably as small as possible because they are causes of a reduction in capacity and further the binder is a cause of an increase in internal resistance. Preferably, the amount of the conduction aid is 10 mass % or less and the amount of the binder is 10 mass % or less.

When the surface area of the activated carbon is larger, the capacity of the lithium-ion capacitor is larger, and therefore, the activated carbon preferably has a specific surface area of 1000 $m^2$/g or more. As a material of the activated carbon, a plant-derived palm shell, a petroleum-based material or the like may be used. In order to increase the surface area of the activated carbon, the material is preferably activated by use of steam or alkali. As the conduction aid, Ketjen Black, acetylene black, carbon fibers or composite materials thereof may be used. As the binder, polyvinylidene fluoride, polytetrafluoroethylene, polyvinyl alcohol, carboxymethyl cellulose, xanthan gum and the like can be used. A solvent may be appropriately selected from water and an organic solvent depending on the type of the binder. In the organic solvent, N-methyl-2-pyrrolidone is often used. Further, when water is used as a solvent, a surfactant may be used for enhancing filling performance.

The electrode material predominantly composed of the activated carbon is mixed and stirred to obtain an activated carbon paste. This activated carbon paste is filled into the above-mentioned current collector and dried, and its density is increased by compressing with a roller press or the like as required to obtain an electrode for a lithium-ion capacitor.

(Filling of Activated Carbon into Aluminum Porous Body)

For filling of the activated carbon, publicly known methods such as a method of filling by immersion and a coating method can be employed. Examples of the coating method include a roll coating method, an applicator coating method, an electrostatic coating method, a powder coating method, a spray coating method, a spray coater coating method, a bar coater coating method, a roll coater coating method, a dip coater coating method, a doctor blade coating method, a wire bar coating method, a knife coater coating method, a blade coating method, and a screen printing method.

When the activated carbon is filled, for example, a conduction aid or a binder is added as required, and an organic solvent or water is mixed therewith to prepare a slurry of a positive electrode mixture. An aluminum porous body is filled with this slurry by the above-mentioned method. As the conduction aid, for example, carbon black such as acetylene black (AB) or Ketjen Black (KB), or carbon fibers such as carbon nano tubes (CNT) may be used. As the binder, for example, polyvinylidene fluoride (PVDF), polytetrafluoroethylene (PTFE), polyvinyl alcohol (PVA), carboxymethyl cellulose (CMC), xanthan gum and the like can be used.

The organic solvent used in preparing the slurry of a positive electrode mixture can be appropriately selected as long as it does not adversely affect materials (i.e., an active material, a conduction aid, a binder, and a solid electrolyte as required) to be filled into the aluminum porous body. Examples of the organic solvent include n-hexane, cyclohexane, heptane, toluene, xylene, trimethylbenzene, dimethyl carbonate, diethyl carbonate, ethyl methyl carbonate, propylene carbonate, ethylene carbonate, butylene carbonate, vinylene carbonate, vinyl ethylene carbonate, tetrahydrofuran, 1,4-dioxane, 1,3-dioxolane, ethylene glycol, and N-methyl-2-pyrrolidone. Further, when water is used as a solvent, a surfactant may be used for enhancing filling performance.

(Negative Electrode)

A negative electrode is not particularly limited and a conventional negative electrode for lithium batteries can be used, but an electrode, in which an active material is filled into a porous body made of copper or nickel like the foamed nickel described above, is preferable because a conventional electrode, in which a copper foil is used for a current collector, has a small capacity. Further, in order to perform the operations as a lithium-ion capacitor, the negative electrode is preferably doped with lithium ions in advance. As a doping method, publicly known methods can be employed. Examples of the doping methods include a method in which a lithium metal foil is affixed to the surface of a negative electrode and this is dipped into an electrolytic solution to dope it, a method in which an electrode having lithium metal fixed thereto is arranged in a lithium-ion capacitor, and after assembling a cell, an electric current is passed between the negative electrode and the lithium metal electrode to electrically dope the electrode, and a method in which an electrochemical cell is assembled from a negative electrode and lithium metal, and a negative electrode electrically doped with lithium is taken out and used.

In any method, it is preferred that the amount of lithium-doping is large in order to adequately decrease the potential of the negative electrode, but the negative electrode is preferably left without being doped by the capacity of the positive electrode because when the residual capacity of the negative electrode is smaller than that of the positive electrode, the capacity of the lithium-ion capacitor becomes small.

(Electrolytic Solution Used in Lithium-Ion Capacitor)

The same nonaqueous electrolytic solution as that used in a lithium battery is used for an electrolytic solution. A nonaqueous electrolytic solution is used in a polar aprotic organic solvent, and specific examples of the nonaqueous electrolytic solution include ethylene carbonate, diethyl carbonate, dimethyl carbonate, propylene carbonate, γ-butyrolactone and sulfolane. As a supporting salt, lithium tetrafluoroborate, lithium hexafluorophosphate, an imide salt or the like is used.

(Preparation of Lithium-Ion Capacitor)

The electrode obtained in the above-mentioned manner is punched out into an appropriate size, and is opposed to the negative electrode with a separator interposed between the punched out electrode and the negative electrode. The negative electrode may be an electrode doped with lithium ions by the above-mentioned method, and when the method of doping the negative electrode after assembling a cell is employed, an electrode having lithium metal connected thereto may be arranged in the cell. A porous film or nonwoven fabric made of cellulose or a polyolefin resin is preferably used for the separator. Then, the electrodes are housed in a cell case by use of required spacers, and impregnated with an electrolytic solution. Finally, a lid is put on the case with an insulating gasket interposed between the lid and the case and is sealed, and thereby a lithium-ion capacitor can be prepared. Materials of the electrode and the like are preferably adequately dried for decreasing the water content in the lithium-ion capacitor as much as possible. Preparation of the lithium-ion capacitor is performed in low-moisture environments, and sealing may be performed in reduced-pressure environments. In addition, the lithium-ion capacitor is not particularly limited as long as the current collector and the electrode of the present invention are used, and capacitors may be used which are prepared by a method other than this method.

(Electrode for Molten Salt Battery)

The aluminum porous body can also be used as an electrode material for molten salt batteries. When the aluminum porous body is used as a positive electrode material, a metal compound such as sodium chromite ($NaCrO_2$) or titanium disulfide ($TiS_2$) into which a cation of a molten salt serving as an electrolyte can be intercalated is used as an active material. The active material is used in combination with a conduction aid and a binder. As the conduction aid, acetylene black or the like may be used. As the binder, polytetrafluoroethylene (PTFE) and the like may be used. When sodium chromite is used as the active material and acetylene black is used as the conduction aid, the binder is preferably PTFE because PTFE can tightly bind sodium chromite and acetylene black.

The aluminum porous body can also be used as a negative electrode material for molten salt batteries. When the aluminum porous body is used as a negative electrode material, sodium alone, an alloy of sodium and another metal, carbon, or the like may be used as an active material. Sodium has a melting point of about 98° C. and a metal becomes softer with an increase in temperature. Thus, it is preferable to alloy sodium with another metal (Si, Sn, In, etc.). In particular, an alloy of sodium and Sn is preferred because of its easiness of handleability. Sodium or a sodium alloy can be supported on the surface of the aluminum porous body by electroplating, hot dipping, or another method. Alternatively, a metal (Si, etc.) to be alloyed with sodium may be deposited on the aluminum porous body by plating and then converted into a sodium alloy by charging in a molten salt battery.

Figure 17:
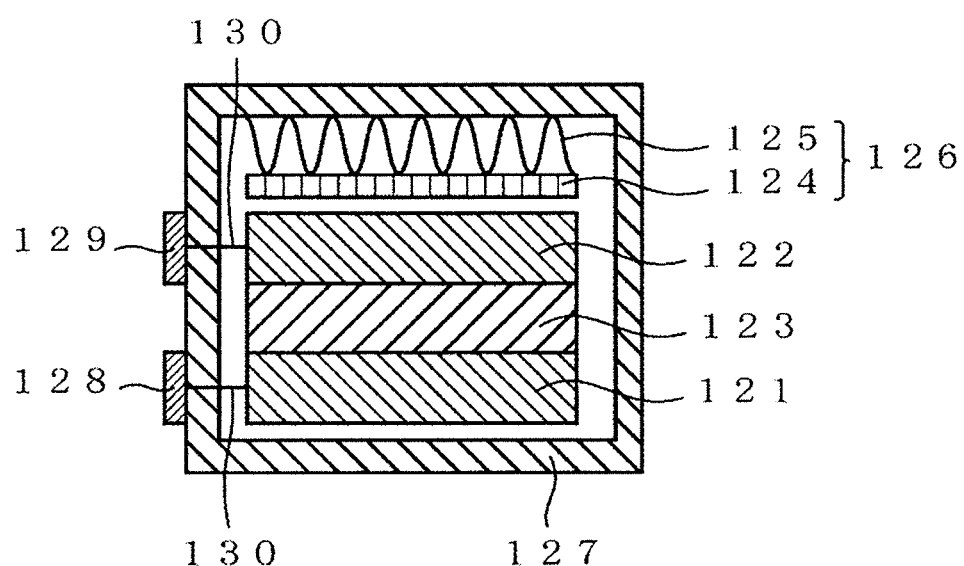
FIG. 17 is a schematic sectional view showing an example of a structure in which an aluminum porous body is applied to a molten salt battery.

FIG. 17 is a schematic sectional view showing an example of a molten salt battery in which the above-mentioned electrode material for batteries is used. The molten salt battery includes a positive electrode 121 in which a positive electrode active material is supported on the surface of an aluminum skeleton of an aluminum porous body, a negative electrode 122 in which a negative electrode active material is supported on the surface of an aluminum skeleton of an aluminum porous body, and a separator 123 impregnated with a molten salt of an electrolyte, which are housed in a case 127. A pressing member 126 including a presser plate 124 and a spring 125 for pressing the presser plate is arranged between the top surface of the case 127 and the negative electrode. By providing the pressing member, the positive electrode 121, the negative electrode 122 and the separator 123 can be evenly pressed to be brought into contact with one another even when their volumes have been changed. A current collector (aluminum porous body) of the positive electrode 121 and a current collector (aluminum porous body) of the negative electrode 122 are connected to a positive electrode terminal 128 and a negative electrode terminal 129, respectively, through a lead wire 130.

The molten salt serving as an electrolyte may be various inorganic salts or organic salts which melt at the operating temperature. As a cation of the molten salt, one or more cations selected from alkali metals such as lithium (Li), sodium (Na), potassium (K), rubidium (Rb) and cesium (Cs), and alkaline earth metals such as beryllium (Be), magnesium (Mg), calcium (Ca), strontium (Sr) and barium (Ba) may be used.

In order to decrease the melting point of the molten salt, it is preferable to use a mixture of at least two salts. For example, use of potassium bis(fluorosulfonyl)amide (K—N(SO$_2$F)$_2$; KFSA) and sodium bis(fluorosulfonyl)amide (Na—N(SO$_2$F)$_2$; NaFSA) in combination can decrease the battery operating temperature to 90° C. or lower.

The molten salt is used in the form of a separator impregnated with the molten salt. The separator prevents the contact between the positive electrode and the negative electrode, and may be a glass nonwoven fabric, a porous resin molded body or the like. A laminate of the positive electrode, the negative electrode, and the separator impregnated with the molten salt housed in a case is used as a battery.

EXAMPLES

Hereinafter, the present invention will be described in more detail based on examples, but the present invention is not limited thereto.

Example 1

Formation of Conductive Layer

A urethane foam having a porosity of 95%, about 46 pores (cells) per inch, a pore diameter of about 552 μm, and a thickness of 1 mm was prepared as a resin molded body and was cut into a 100 mm×30 mm square. A film of aluminum was formed on the surface of the polyurethane foam in a weight per unit area of 10 g/m$^2$ by the sputtering method to perform a conductive treatment.
(Molten Salt Plating)

The urethane foam having a conductive layer formed on the surface thereof was loaded as a piece of work in a jig having an electricity supply function, and then the jig was placed in a glove box, the interior of which was adjusted to an argon atmosphere and low moisture (a dew point of −30° C. or lower), and was dipped in a molten salt aluminum plating bath (33 mol % EMIC-67 mol % AlCl$_3$) at a temperature of 40° C. The jig holding the piece of work was connected to the cathode of a rectifier, and an aluminum plate (purity 99.99%) of the counter electrode was connected to the anode. The piece of work was plated by applying a direct current at a current density of 3.6 A/dm$^2$ for 90 minutes to obtain an aluminum structure in which 150 g/m$^2$ of an aluminum plated layer was formed on the surface of the urethane foam. Stirring was performed with a stirrer using a Teflon (registered trademark) rotor. Here, the current density was calculated based on the apparent area of the urethane foam.
(Decomposition of Resin Molded Body)

Each of the above-mentioned aluminum structures was dipped in a LiCl—KCl eutectic molten salt at a temperature of 500° C., and a negative potential of −1 V was applied to the aluminum structure for 30 minutes. Air bubbles resulting from the decomposition reaction of the polyurethane were generated in the molten salt. Then, the aluminum structure was cooled to room temperature in the atmosphere and was washed with water to remove the molten salt, to thereby obtain an aluminum porous body from which the resin had been removed. The obtained aluminum porous body had continuous pores and a high porosity as with the urethane foam used as a core material.
(Processing of End Part of Aluminum Porous Body)

The thickness of the obtained aluminum porous body was adjusted to 0.96 mm by roller pressing, and the aluminum porous body was cut into a piece of 5 cm square.

As preparation of welding, a SUS block (rod) having a width of 5 mm and a hammer were used as a compressing jig, and the SUS block was placed at a location 5 mm from one end of the aluminum porous body and the porous body was compressed by beating the SUS block with the hammer to form a compressed part having a thickness of 100 μm.

Thereafter, a tab lead was welded by spot welding under the following conditions.
<Welding Condition>
  Welding apparatus: Hi-Max 100 manufactured by Panasonic Corporation, model No. YG-101 UD
  (Voltage can be applied up to 250 V)
  Capacity: 100 Ws, 0.6 kVA
  Electrode: Copper electrode of 2 mm in diameter
  Load: 8 kgf
  Voltage: 140 V
<Tab Lead>
  Material: aluminum
  Dimension: width 5 mm, length 7 cm, thickness 100 μm
  Surface condition: boehmite treatment
(Filling of Slurry into Aluminum Porous Body)

A lithium cobalt oxide powder (positive electrode active material) having an average particle diameter of 5 μm was prepared as an active material, and the lithium cobalt oxide powder, acetylene black (conduction aid) and PVDF (binder) were mixed in proportions of 90:5:5 in terms of mass %. N-Methyl-2-pyrrolidone (organic solvent) was added dropwise to the mixture, and the resulting mixture was mixed to prepare a paste-like slurry of a positive electrode mixture. Next, the slurry of a positive electrode mixture was filled into the aluminum porous body. Thereafter, the slurry was dried at 100° C. for 40 minutes to remove the organic solvent, to thereby obtain an electrode 1 for a positive electrode.

The obtained electrode 1 for a positive electrode was polished to expose a cross section thereof. Then, a cross section of the electrode was observed with SEM, and consequently it was confirmed that a cell of the aluminum porous body has an elliptic shape having a minor axis in the thickness direction of the electrode in the width direction and longitudinal direction of the electrode.

Example 2

An electrode 2 for a positive electrode was prepared in the same manner as in Example 1 except for preparing an electrode while applying a tensile force. A cross section of the obtained aluminum porous body was observed in the same manner as in Example 1, and consequently it was confirmed that a cell of the aluminum porous body has an elliptic shape having a minor axis in the width direction of the electrode.

Example 3

An electrode 3 for a positive electrode was prepared in the same manner as in Example 1 except for using the aluminum porous body without compression.

A cross section of the obtained aluminum porous body was observed in the same manner as in Example 1, and consequently it was confirmed that a cell of the aluminum porous body has a circular shape.

Example 4

An electrode 4 for a positive electrode having a thickness of 1 mm and a weight per unit area of 140 g/m$^2$ was obtained in the same manner as in Example 1 except for using, as a starting material, a urethane foam having a porosity of 95%, 58 pores (cells) per inch, a pore diameter of about 438 μm and a thickness of 1 mm as a resin molded body made of polyurethane.

The obtained electrode 4 for a positive electrode was polished to expose a cross section thereof. Then, the cross section of the electrode was observed with SEM and a photograph of the cross section was taken. The photograph was divided into three regions in the thickness direction of the electrode, and these regions were defined as a region 1, a region 2 and a region 3. Then, the number of cross sections of an aluminum skeleton in each region was measured by image processing.

As a result, the number of cross sections was 41 in the region 1, 40 in the region 2 and 42 in the region 3. A ratio of the number of cross sections of the aluminum skeleton in the region 1 to the number of cross sections of the aluminum skeleton in the region 2 was 1.03. A ratio of the number of cross sections of the aluminum skeleton in the region 3 to the number of cross sections of the aluminum skeleton in the region 2 was 1.05.

Example 5

An aluminum porous body A having a thickness of 1 mm and a weight per unit area of 140 g/m$^2$ and an aluminum porous body C having a thickness of 1 mm and a weight per unit area of 140 g/m$^2$ were obtained in the same manner as in Example 1 except for using, as a starting material, a urethane foam having a porosity of 95%, 58 pores (cells) per inch, a pore diameter of about 438 μm and a thickness of 1 mm as a resin molded body made of polyurethane.

Similarly, an aluminum porous body B having a thickness of 1 mm and a weight per unit area of 140 g/m$^2$ was obtained in the same manner as in Example 1 except for using, as a starting material, a urethane foam having a porosity of 95%, 40 pores (cells) per inch, a cell diameter of about 635 μm and a thickness of 1 mm as a resin molded body made of polyurethane.

Then, the aluminum porous bodies A, B and C were unified by laminating the aluminum porous bodies A, B and C in this order, roll-pressing them prior to the preparation of an electrode, and then being subjected to partial welding.

Thereafter, an electrode 5 for a positive electrode was obtained in the same manner as in Example 1.

A cross section of the obtained electrode 5 for a positive electrode was observed in the same manner as in Example 4.

As a result, the number of cross sections was 40 in the region 1, 30 in the region 2 and 42 in the region 3. A ratio of the average of the number of cross sections of the aluminum skeletons in the region 1 and the region 3 to the number of cross sections of the aluminum skeleton in the region 2 was 1.37.

Example 6

An aluminum porous body D having a thickness of 1 mm and a weight per unit area of 140 g/m$^2$ and an aluminum porous body F having a thickness of 1 mm and a weight per unit area of 140 g/m$^2$ were obtained in the same manner as in Example 1 except for using, as a starting material, a urethane foam having a porosity of 95%, 40 pores (cells) per inch, a pore diameter of about 635 μm and a thickness of 1 mm as a resin molded body made of polyurethane.

Similarly, an aluminum porous body E having a thickness of 1 mm and a weight per unit area of 140 g/m$^2$ was obtained in the same manner as in Example 1 except for using, as a starting material, a urethane foam having a porosity of 95%, about 58 pores (cells) per inch, a cell diameter of about 438 μm and a thickness of 1 mm as a resin molded body made of polyurethane.

Then, the aluminum porous bodies D, E and F were unified by laminating the aluminum porous bodies D, E and F in this order, roll-pressing them prior to the preparation of an electrode, and then being subjected to partial welding.

Thereafter, an electrode 6 for a positive electrode was obtained in the same manner as in Example 1.

Across section of the obtained electrode 6 for a positive electrode was observed in the same manner as in Example 4.

As a result, the number of cross sections was 31 in the region 1, 41 in the region 2 and 32 in the region 3. A ratio of the average of the number of cross sections of the aluminum skeletons in the region 1 and the region 3 to the number of cross sections of the aluminum skeleton in the region 2 was 1.3.

Example 7

An electrode 7 for a positive electrode having a thickness of 1 mm and a weight per unit area of 140 g/m$^2$ was obtained in the same manner as in Example 1 except for using, as a starting material, a urethane foam having a porosity of 95%, about 50 pores (cells) per inch, a pore diameter of about 508 μm and a thickness of 1 mm as a resin molded body made of polyurethane.

A cross section of the obtained electrode 7 for a positive electrode was observed in the same manner as in Example 1.

As a result, the outermost surface of the aluminum porous body was covered with an active material, and a skeleton of the aluminum porous body was not exposed from the surface of the electrode.

Example 8

As a starting material, a urethane foam having a porosity of 95%, about 50 pores (cells) per inch, a pore diameter of about 508 μm and a thickness of 1 mm was used as a resin molded body made of polyurethane. Then, an electrode was prepared in the same manner as in Example 1, and finally, the active material remaining on the surface of the electrode was removed with a brush to obtain a current collector 8 for a positive electrode. The obtained electrode had a thickness of 1 mm and a weight per unit area of 140 g/m$^2$.

A cross section of the obtained electrode 8 for a positive electrode was observed in the same manner as in Example 1.

As a result, the active material was not present in a portion from the outermost surface to a depth of 0.02 mm of the aluminum porous body.

The present invention has been described based on embodiments, but it is not limited to the above-mentioned embodiments. Variations to these embodiments may be made within the scope of identity and equivalence of the present invention.

INDUSTRIAL APPLICABILITY

The electrode of the present invention can be suitably used for nonaqueous electrolyte batteries (lithium battery and the like), a nonaqueous electrolyte capacitor and a nonaqueous electrolyte lithium-ion capacitor.

REFERENCE SIGNS LIST

1 Resin molded body
2 Conductive layer
3 Aluminum-plated layer
21a, 21b Plating bath
22 Strip-shaped resin
23, 28 Plating bath
24 Cylindrical electrode
25, 27 Anode
26 Electrode roller
32 Compressing jig
33 Compressed part
34 Aluminum porous body
35 Rotating roller
36 Rotation axis of roller
37 Tab lead
38 Insulating/sealing tape
41 Winding off roller
42 Compressing roller
43 Compressing-welding roller
44 Filling roller
45 Drying machine
46 Compressing roller
47 Cutting roller
48 Wind-up roller
49 Lead supply roller
50 Slurry supply nozzle
51 Slurry
60 Lithium battery
61 Positive electrode
62 Negative electrode
63 Electrolyte layer
64 Positive electrode layer (positive electrode body)
65 Current collector of positive electrode
66 Negative electrode layer
67 Current collector of negative electrode
121 Positive electrode
122 Negative electrode
123 Separator
124 Presser plate
125 Spring
126 Pressing member
127 Case
128 Positive electrode terminal
129 Negative electrode terminal
130 Lead wire
141 Polarizable electrode
142 Separator
143 Organic electrolytic solution
144 Lead wire
145 Case
146 Positive electrode
147 Negative electrode
148 Lead wire
149 Lead wire

The invention claimed is:

1. An electrode comprising a three-dimensional network aluminum porous body as a base material, wherein
the electrode is a sheet-shaped electrode, and
the three-dimensional network aluminum porous body has an elliptic shaped cell, and
wherein when a cross section in the thickness direction of the electrode is divided into three regions of a region 1, a region 2 and a region 3 in this order,
a ratio of the average of the number of cross sections of an aluminum skeleton in the region 1 and the region 3 to the number of cross sections of an aluminum skeleton in the region 2 is larger than 1.2.

2. The electrode according to claim 1, wherein
the three-dimensional network aluminum porous body has an elliptic shaped cell having a minor axis in a thickness direction of the electrode in a cross section parallel to a longitudinal direction and the thickness direction of the electrode, and
the three-dimensional network aluminum porous body has an elliptic shaped cell having a minor axis in the thickness direction of the electrode in a cross section parallel to a width direction and the thickness direction of the electrode.

3. The electrode according to claim 1, which is obtained by subjecting the three-dimensional network aluminum porous body to at least a current collecting lead welding step, an active material filling step and a compressing step.

4. The electrode according to claim 1, wherein the outermost surface of the three-dimensional network aluminum porous body is covered with an active material, and the three-dimensional network aluminum porous body is not exposed from the active material.

5. The electrode according to claim 1, wherein the active material is not present in a portion from the outermost surface to a depth of 0.02 mm of the three-dimensional network aluminum porous body.

6. The electrode according to claim 1, wherein
the three-dimensional network aluminum porous body has an elliptic shaped cell having a minor axis in a width direction of the electrode in a cross section parallel to a thickness direction of the electrode.

7. A nonaqueous electrolyte battery, comprising using the electrode according to claim 1.

8. A capacitor with a nonaqueous electrolytic solution, comprising using the electrode according to claim 1.

9. A lithium-ion capacitor with a nonaqueous electrolytic solution, comprising using the electrode according to claim 1.

* * * * *